(12) United States Patent
Hoscheit et al.

(10) Patent No.: US 12,719,916 B1
(45) **Date of Patent: *Aug. 25, 2026**

(54) RISK SCORING BASED ON COMPLIANCE VERIFICATION TEST RESULTS IN A LOCAL NETWORK

(71) Applicant: Tanium Inc., Emeryville, CA (US)

(72) Inventors: James B. Hoscheit, Gallatin, TN (US); Peyton T. Ball, Smyrna, TN (US); E. Egon Rinderer, Rossville, TN (US); John Phillip Ham, Lee's Summit, MO (US)

(73) Assignee: Tanium Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,278

(22) Filed: Jan. 15, 2025

Related U.S. Application Data

(63) Continuation of application No. 18/374,621, filed on Sep. 28, 2023, now Pat. No. 12,231,457, which is a (Continued)

(51) Int. Cl.
*H04L 9/40* (2022.01)
*H04L 43/50* (2022.01)

(52) U.S. Cl.
CPC .......... *H04L 63/1433* (2013.01); *H04L 43/50* (2013.01); *H04L 63/20* (2013.01)

(58) Field of Classification Search
CPC ...... H04L 63/1433; H04L 43/50; H04L 63/20
(Continued)

(56) References Cited

U.S. PATENT DOCUMENTS 5,220,596 A 6/1993 Patel
5,842,202 A 11/1998 Kon
(Continued)

FOREIGN PATENT DOCUMENTS

CN 101933003 B 9/2015
EP 1553747 A1 7/2005
(Continued)

OTHER PUBLICATIONS

Non-Final Office Action, U.S. Appl. No. 14/553,769, Feb. 9, 2017, 16 pages.
(Continued)

*Primary Examiner* — Liang Che A Wang
(74) *Attorney, Agent, or Firm* — Nicholson De Vos Webster & Elliott LLP

(57) ABSTRACT

A server system sends, via a linearly ordered communication orbit, to computational machines at a first subset of nodes in a computer network, a set of local environment verification tests and a set of mappings that map results of the local environment verification tests into a set of risk scores. Requests sent by the server system cause the computational machines at the plurality of nodes to: locally evaluate the set of local environment verification tests to produce test results, and locally map the test results using the set of mappings into a set of risk scores. Queries sent by the server cause the computational machines at the plurality of nodes to return to the server system at least a portion of the test results and risk scores. The server, identifies, based on the received test results and risk scores, computational machines and/or control categories having risk scores satisfying predefined criteria.

20 Claims, 17 Drawing Sheets

Related U.S. Application Data continuation of application No. 18/099,854, filed on Jan. 20, 2023, now Pat. No. 11,777,981, which is a continuation of application No. 17/001,586, filed on Aug. 24, 2020, now Pat. No. 11,563,764.

(58) Field of Classification Search
USPC ...................... 726/1; 709/217, 218, 219, 251
See application file for complete search history.

(56) References Cited

U.S. PATENT DOCUMENTS 5,949,755 A 9/1999 Upadhya et al.
6,049,828 A 4/2000 Dev et al.
6,055,545 A 4/2000 Yazaki et al.
6,226,493 B1 5/2001 Leopold et al.
6,615,213 B1 9/2003 Johnson
6,879,979 B2 4/2005 Hindawi et al.
6,885,644 B1 4/2005 Knop et al.
6,959,000 B1 10/2005 Lee
7,043,550 B2 5/2006 Knop et al.
7,096,503 B1 * 8/2006 Magdych .............. G06F 21/577 713/189
7,111,059 B1 9/2006 Garcea et al.
7,120,693 B2 10/2006 Chang et al.
7,225,243 B1 5/2007 Wilson
7,231,393 B1 6/2007 Harik et al.
7,240,044 B2 7/2007 Chaudhuri et al.
7,299,047 B2 11/2007 Dolan et al.
7,483,430 B1 1/2009 Yuan et al.
7,555,545 B2 6/2009 McCasland
7,600,018 B2 10/2009 Maekawa et al.
7,693,813 B1 4/2010 Cao et al.
7,698,453 B2 4/2010 Samuels et al.
7,702,614 B1 4/2010 Shah et al.
7,720,641 B2 5/2010 Alagappan et al.
7,761,557 B2 7/2010 Fellenstein et al.
7,769,848 B2 8/2010 Choy et al.
7,844,687 B1 11/2010 Gelvin et al.
7,870,613 B2 1/2011 Porter et al.
7,925,655 B1 4/2011 Power et al.
7,962,590 B1 6/2011 Or et al.
8,078,668 B2 12/2011 Moreau
8,086,594 B1 12/2011 Cao et al.
8,086,729 B1 12/2011 Hindawi et al.
8,139,508 B1 3/2012 Roskind
8,166,021 B1 4/2012 Cao et al.
8,166,045 B1 4/2012 Mazumdar et al.
8,185,612 B1 5/2012 Arolovitch et al.
8,185,615 B1 5/2012 Mcdysan et al.
8,271,522 B2 9/2012 Mehul et al.
8,392,530 B1 3/2013 Manapragada et al.
8,477,660 B2 7/2013 Lee et al.
8,504,879 B2 8/2013 Poletto et al.
8,510,562 B2 8/2013 Ramakrishnan et al.
8,650,160 B1 2/2014 Beatty et al.
8,677,448 B1 3/2014 Kauffman et al.
8,682,901 B1 3/2014 Cao et al.
8,813,228 B2 8/2014 Magee et al.
8,819,769 B1 * 8/2014 van Dijk ............... H04L 67/303 726/1
8,885,521 B2 11/2014 Wang et al.
8,903,973 B1 12/2014 Hindawi et al.
8,904,039 B1 12/2014 Hindawi et al.
8,972,566 B1 3/2015 Hindawi et al.
9,009,827 B1 4/2015 Albertson et al.
9,059,961 B2 6/2015 Hindawi et al.
9,104,794 B2 8/2015 Zakonov et al.
9,129,028 B2 9/2015 Zhang et al.
9,246,977 B2 1/2016 Hindawi et al.
9,576,131 B2 2/2017 Tuvell et al.
9,609,007 B1 3/2017 Rivlin et al.
9,667,738 B2 5/2017 Hindawi et al.
9,716,649 B2 7/2017 Bent et al.
9,729,429 B2 8/2017 Hindawi et al.
9,769,037 B2 9/2017 Hindawi et al.
9,769,275 B2 9/2017 Hindawi et al.
9,800,603 B1 10/2017 Sidagni
9,910,752 B2 3/2018 Lippincott et al.
9,973,525 B1 5/2018 Roturier et al.
9,985,982 B1 5/2018 Bartos et al.
9,998,955 B1 6/2018 Maccarthaigh
10,015,185 B1 7/2018 Kolman et al.
10,095,864 B2 10/2018 Hunt et al.
10,111,208 B2 10/2018 Hindawi et al.
10,136,415 B2 11/2018 Hindawi et al.
10,148,536 B2 12/2018 Hindawi et al.
10,261,770 B2 4/2019 Devagupthapu et al.
10,360,093 B2 7/2019 Rahman et al.
10,372,904 B2 8/2019 Hunt et al.
10,412,188 B2 9/2019 Hindawi et al.
10,482,242 B2 11/2019 Hunt et al.
10,484,429 B1 * 11/2019 Fawcett .................. H04L 63/20
10,498,744 B2 12/2019 Hunt et al.
10,649,870 B1 5/2020 Lippincott et al.
10,674,486 B2 6/2020 Hindawi et al.
10,708,116 B2 7/2020 Hindawi et al.
10,795,906 B1 10/2020 Teubner
10,824,729 B2 11/2020 Hoscheit et al.
10,841,365 B2 11/2020 White et al.
10,873,645 B2 12/2020 Freilich et al.
10,929,345 B2 2/2021 Stoddard et al.
11,032,298 B1 6/2021 Robbins et al.
11,100,199 B2 8/2021 Subramaniam
11,151,246 B2 10/2021 Davis et al.
11,153,383 B2 10/2021 Richards et al.
11,172,470 B1 11/2021 Guieu et al.
11,258,654 B1 2/2022 Hindawi et al.
11,262,990 B2 3/2022 Parthasarathy et al.
11,277,489 B2 3/2022 Freilich et al.
11,301,568 B1 4/2022 Dargude et al.
11,343,355 B1 5/2022 Goela et al.
11,372,938 B1 6/2022 Stoddard et al.
11,461,208 B1 10/2022 Lippincott et al.
11,563,764 B1 1/2023 Hoscheit et al.
11,609,835 B1 3/2023 Varga et al.
11,700,303 B1 7/2023 Richards et al.
11,711,810 B1 7/2023 Guieu et al.
11,777,981 B1 10/2023 Hoscheit et al.
11,809,294 B1 11/2023 Lippincott et al.
11,831,670 B1 11/2023 Molls et al.
11,886,229 B1 1/2024 Goela et al.
11,914,495 B1 2/2024 Varga et al.
11,956,335 B1 4/2024 Goela et al.
12,071,262 B2 8/2024 Turner et al.
12,229,032 B1 2/2025 Varga et al.
2001/0056461 A1 12/2001 Kampe et al.
2002/0007404 A1 1/2002 Vange et al.
2002/0042693 A1 4/2002 Kampe et al.
2002/0073086 A1 6/2002 Thompson et al.
2002/0099952 A1 7/2002 Lambert et al.
2002/0198867 A1 12/2002 Lohman et al.
2003/0008712 A1 1/2003 Poulin
2003/0101253 A1 5/2003 Saito et al.
2003/0120603 A1 6/2003 Kojima et al.
2003/0131044 A1 7/2003 Nagendra et al.
2003/0212676 A1 11/2003 Bruce et al.
2003/0212821 A1 11/2003 Gillies et al.
2004/0037374 A1 2/2004 Gonikberg
2004/0044727 A1 3/2004 Abdelaziz et al.
2004/0044790 A1 3/2004 Loach et al.
2004/0054723 A1 3/2004 Dayal et al.
2004/0054889 A1 3/2004 Pitsos
2004/0064522 A1 4/2004 Zhang et al.
2004/0076164 A1 4/2004 Vanderveen et al.
2004/0190085 A1 9/2004 Silverbrook et al.
2005/0004907 A1 1/2005 Bruno et al.
2005/0053000 A1 3/2005 Oliver et al.
2005/0108356 A1 5/2005 Rosu et al.
2005/0108389 A1 5/2005 Kempin et al.
2005/0195755 A1 9/2005 Senta et al.
2006/0039371 A1 2/2006 Castro et al.
2006/0128406 A1 6/2006 Macartney
2006/0133274 A1 6/2006 Lee et al.
2006/0282505 A1 12/2006 Hasha et al.

(56) References Cited

U.S. PATENT DOCUMENTS

2007/0005738 A1 1/2007 Alexion-Tiernan et al.
2007/0083617 A1 4/2007 Chakrabarti et al.
2007/0171844 A1 7/2007 Loyd et al.
2007/0211651 A1 9/2007 Ahmed et al.
2007/0230482 A1 10/2007 Shim et al.
2007/0261051 A1 11/2007 Porter et al.
2008/0049631 A1 2/2008 Morrill
2008/0082628 A1 4/2008 Rowstron et al.
2008/0133582 A1 6/2008 Andersch et al.
2008/0258880 A1 10/2008 Smith et al.
2008/0263031 A1 10/2008 George et al.
2008/0288646 A1 11/2008 Hasha et al.
2008/0301256 A1 12/2008 McWilliams et al.
2009/0125639 A1 5/2009 Dam et al.
2009/0259518 A1 10/2009 Harvey et al.
2009/0271360 A1 10/2009 Bestgen et al.
2009/0285204 A1 11/2009 Gallant et al.
2009/0319503 A1 12/2009 Mehul et al.
2009/0328115 A1 12/2009 Malik
2010/0011060 A1 1/2010 Hilterbrand et al.
2010/0070570 A1 3/2010 Lepeska
2010/0085948 A1 4/2010 Yu et al.
2010/0094862 A1 4/2010 Bent et al.
2010/0154026 A1 6/2010 Chatterjee et al.
2010/0260178 A1 10/2010 Huang et al.
2010/0296416 A1 11/2010 Lee et al.
2010/0306252 A1 12/2010 Jarvis et al.
2011/0066719 A1 3/2011 Miryanov et al.
2011/0099562 A1 4/2011 Nandy et al.
2011/0138312 A1 6/2011 Yeh et al.
2011/0231431 A1 9/2011 Kamiwada et al.
2011/0271319 A1 11/2011 Venable, Sr.
2011/0299455 A1 12/2011 Ordentlich et al.
2012/0053957 A1* 3/2012 Atkins .................. G16H 50/30 705/2
2012/0110183 A1 5/2012 Miranda et al.
2012/0221692 A1 8/2012 Steiner et al.
2012/0269096 A1 10/2012 Roskind
2012/0330700 A1 12/2012 Garg et al.
2013/0110931 A1 5/2013 Kim et al.
2013/0170336 A1 7/2013 Chen et al.
2013/0212296 A1 8/2013 Goel et al.
2013/0276053 A1 10/2013 Hugard et al.
2013/0326494 A1 12/2013 Nunez
2014/0075505 A1 3/2014 Subramanian
2014/0101133 A1 4/2014 Carston et al.
2014/0149557 A1 5/2014 Lohmar et al.
2014/0164290 A1 6/2014 Salter
2014/0164552 A1 6/2014 Kim et al.
2014/0181247 A1 6/2014 Hindawi et al.
2014/0181295 A1 6/2014 Hindawi et al.
2014/0244727 A1 8/2014 Kang et al.
2014/0279044 A1 9/2014 Summers et al.
2014/0280280 A1 9/2014 Singh
2014/0282586 A1 9/2014 Shear et al.
2014/0372533 A1 12/2014 Fu et al.
2014/0375528 A1 12/2014 Ling
2015/0058619 A1 2/2015 Sweet et al.
2015/0080039 A1 3/2015 Ling et al.
2015/0149624 A1 5/2015 Hindawi et al.
2015/0163121 A1 6/2015 Mahaffey et al.
2015/0172228 A1 6/2015 Zalepa et al.
2015/0199511 A1 7/2015 Faile et al.
2015/0199629 A1 7/2015 Faile et al.
2015/0256575 A1 9/2015 Scott
2015/0302458 A1 10/2015 Dides et al.
2015/0312335 A1 10/2015 Ying et al.
2015/0372911 A1 12/2015 Yabusaki et al.
2015/0373043 A1 12/2015 Wang et al.
2015/0378743 A1 12/2015 Zellermayer et al.
2016/0034692 A1 2/2016 Singler
2016/0080408 A1 3/2016 Coleman et al.
2016/0119251 A1 4/2016 Solis et al.
2016/0255142 A1 9/2016 Hunt et al.
2016/0255143 A1 9/2016 Hunt et al.
2016/0269434 A1 9/2016 Divalentin et al.
2016/0286540 A1 9/2016 Hindawi et al.
2016/0352588 A1 12/2016 Subbarayan et al.
2016/0360006 A1 12/2016 Hopkins et al.
2016/0378450 A1 12/2016 Fu et al.
2017/0093915 A1 3/2017 Ellis et al.
2017/0118074 A1 4/2017 Feinstein et al.
2017/0133843 A1 5/2017 Mcneill-Mccallum et al.
2017/0257432 A1 9/2017 Fu et al.
2017/0286690 A1* 10/2017 Chari .................. H04L 63/1433
2017/0346824 A1* 11/2017 Mahabir ............. H04L 63/1433
2018/0013768 A1 1/2018 Hunt et al.
2018/0039486 A1 2/2018 Kulkarni et al.
2018/0074483 A1 3/2018 Cruz
2018/0074796 A1 3/2018 Alabes et al.
2018/0191747 A1 7/2018 Nachenberg et al.
2018/0191766 A1 7/2018 Holeman et al.
2018/0267794 A1 9/2018 Atchison et al.
2018/0270127 A1 9/2018 Pang et al.
2018/0321961 A1 11/2018 Gunda et al.
2018/0351792 A1 12/2018 Hunter et al.
2018/0351793 A1 12/2018 Hunter et al.
2018/0375892 A1 12/2018 Ganor
2019/0034478 A1 1/2019 Dolbear et al.
2019/0081981 A1* 3/2019 Bansal ................ H04W 12/122
2019/0096217 A1 3/2019 Pourmohammad et al.
2019/0138512 A1 5/2019 Pourmohammad et al.
2019/0260638 A1 8/2019 Yocam et al.
2019/0280867 A1 9/2019 Kurian
2019/0319987 A1* 10/2019 Levy ....................... G06F 21/45
2019/0361843 A1 11/2019 Stoddard et al.
2020/0028890 A1 1/2020 White et al.
2020/0053072 A1 2/2020 Glozman et al.
2020/0195693 A1* 6/2020 Price ..................... G06F 21/552
2020/0198867 A1 6/2020 Nakamichi
2020/0202007 A1 6/2020 Nagaraja et al.
2020/0304536 A1* 9/2020 Mahabir ............. H04L 63/1475
2021/0027401 A1 1/2021 Hovhannisyan et al.
2021/0218711 A1 7/2021 Biran et al.
2021/0373861 A1 12/2021 Parthasarathy et al.
2022/0272084 A1 8/2022 Hyatt
2023/0036694 A1 2/2023 Steven
2023/0058040 A1 2/2023 Nevius et al.
2023/0360040 A1 11/2023 Childe et al.

FOREIGN PATENT DOCUMENTS

EP 2493118 A1 8/2012
JP 2007-279978 A 10/2007
WO 2004/010298 A1 1/2004

OTHER PUBLICATIONS

Non-Final Office Action, U.S. Appl. No. 14/554,711, Jul. 29, 2016, 23 pages.
Non-Final Office Action, U.S. Appl. No. 14/554,739, Aug. 26, 2016, 30 pages.
Non-Final Office Action, U.S. Appl. No. 15/004,757, Jun. 21, 2017, 23 pages.
Non-Final Office Action, U.S. Appl. No. 15/004,757, Mar. 9, 2018, 57 pages.
Non-Final Office Action, U.S. Appl. No. 15/215,468, Oct. 4, 2018, 13 pages.
Non-Final Office Action, U.S. Appl. No. 15/215,474, Sep. 10, 2018, 10 pages.
Non-Final Office Action, U.S. Appl. No. 15/668,665, Aug. 7, 2019, 11 pages.
Non-Final Office Action, U.S. Appl. No. 15/702,617, Jun. 1, 2018, 37 pages.
Non-Final Office Action, U.S. Appl. No. 16/443,720, Sep. 4, 2020, 13 pages.
Non-Final Office Action, U.S. Appl. No. 16/870,742, Oct. 28, 2021, 7 pages.
Non-Final Office Action, U.S. Appl. No. 16/917,800, Jul. 1, 2021, 7 pages.
Non-Final Office Action, U.S. Appl. No. 16/943,291, Jul. 16, 2021, 19 pages.

(56) References Cited

OTHER PUBLICATIONS

Non-Final Office Action, U.S. Appl. No. 16/943,307, Apr. 27, 2022, 7 pages.
Non-Final Office Action, U.S. Appl. No. 16/952,009, Aug. 1, 2022, 8 pages.
Non-Final Office Action, U.S. Appl. No. 17/001,586, Jun. 9, 2022, 7 pages.
Non-Final Office Action, U.S. Appl. No. 17/129,638, Jul. 23, 2021, 7 pages.
Non-Final Office Action, U.S. Appl. No. 17/182,083, Apr. 27, 2023, 7 pages.
Non-Final Office Action, U.S. Appl. No. 17/503,023, Nov. 25, 2022, 7 pages.
Non-Final Office Action, U.S. Appl. No. 17/521,686, Oct. 4, 2022, 38 pages.
Non-Final Office Action, U.S. Appl. No. 17/732,402, May 21, 2024, 20 pages.
Non-Final Office Action, U.S. Appl. No. 17/751,504, Jun. 9, 2023, 31 pages.
Non-Final Office Action, U.S. Appl. No. 17/856,787, Apr. 11, 2024, 21 pages.
Non-Final Office Action, U.S. Appl. No. 18/123,930, Jul. 14, 2023, 7 pages.
Non-Final Office Action, U.S. Appl. No. 18/196,980, Sep. 8, 2023, 17 pages.
Non-Final Office Action, U.S. Appl. No. 18/196,980, Sep. 19, 2024, 24 pages.
Non-Final Office Action, U.S. Appl. No. 18/204,351, Jan. 5, 2024, 8 pages.
Non-Final Office Action, U.S. Appl. No. 18/225,620, Mar. 14, 2024, 14 pages.
Non-Final Office Action, U.S. Appl. No. 18/374,621, Aug. 16, 2024, 9 pages.
Non-Final Office Action, U.S. Appl. No. 18/440,922), Sep. 5, 2024, 14 pages.
Non-Final Office Action, U.S. Appl. No. 18/516,882, Aug. 28, 2024, 11 pages.
Notice of Allowability, U.S. Appl. No. 17/751,504, Dec. 18, 2023, 11 pages.
Notice of Allowance, U.S. Appl. No. 12/412,623, Oct. 5, 2011, 5 pages.
Notice of Allowance, U.S. Appl. No. 13/084,923, Jul. 30, 2014, 7 pages.
Notice of Allowance, U.S. Appl. No. 13/107,625, Apr. 23, 2014, 7 pages.
Notice of Allowance, U.S. Appl. No. 13/107,625, Oct. 22, 2014, 7 pages.
Notice of Allowance, U.S. Appl. No. 13/301,250, Jan. 21, 2014, 10 pages.
Notice of Allowance, U.S. Appl. No. 13/301,250, Oct. 24, 2014, 8 pages.
Notice of Allowance, U.S. Appl. No. 13/797,946, Sep. 11, 2015, 18 pages.
Notice of Allowance, U.S. Appl. No. 13/797,962, Feb. 17, 2015, 10 pages.
Notice of Allowance, U.S. Appl. No. 14/530,601, Apr. 5, 2017, 8 pages.
Notice of Allowance, U.S. Appl. No. 14/553,769, May 19, 2017, 6 pages.
Notice of Allowance, U.S. Appl. No. 14/554,711, Jan. 27, 2017, 22 pages.
Notice of Allowance, U.S. Appl. No. 14/554,739, May 9, 2017, 20 pages.
Notice of Allowance, U.S. Appl. No. 15/004,757, Jul. 16, 2018, 7 pages.
Notice of Allowance, U.S. Appl. No. 15/136,790, Nov. 20, 2017, 11 pages.
Notice of Allowance, U.S. Appl. No. 15/174,850, Jun. 20, 2018, 39 pages.
Notice of Allowance, U.S. Appl. No. 15/215,468, Apr. 1, 2019, 8 pages.
Notice of Allowance, U.S. Appl. No. 15/215,468, Jan. 24, 2019, 8 pages.
Notice of Allowance, U.S. Appl. No. 15/215,474, Jul. 11, 2019, 9 pages.
Final Office Action, U.S. Appl. No. 18/421,881, Aug. 13, 2025, 15 pages.
Non-Final Office Action, U.S. Appl. No. 18/604,488, Jul. 10, 2025, 14 pages.
Non-Final Office Action, U.S. Appl. No. 19/031,160, Sep. 10, 2025, 9 pages.
Advisory Action, U.S. Appl. No. 18/421,881, Oct. 1, 2025, 3 pages.
Notice of Allowance, U.S. Appl. No. 18/604,488, Nov. 20, 2025, 13 pages.
Non-Final Office Action, U.S. Appl. No. 18/196,980, Feb. 5, 2026, 29 pages.
Notice of Allowance, U.S. Appl. No. 19/031,160, Jan. 21, 2026, 11 pages.
Requirement for Restriction/Election, U.S. Appl. No. 13/107,625, Oct. 11, 2013, 6 pages.
Sean Rhea et al., "Handling Churn in a DHT", 2004, pp. 1-14 (Year: 2004).
Stoica et al., "Chord: A Scalable Peer-to-Peer Lookup Service for Internet Applications", 2001, pp. 1-12 (Year: 2002).
Supplemental Notice of Allowability, U.S. Appl. No. 16/443,720, Aug. 4, 2021, 2 pages.
Supplemental Notice of Allowability, U.S. Appl. No. 16/870,742, Apr. 11, 2022, 2 pages.
Supplemental Notice of Allowability, U.S. Appl. No. 18/204,351, Oct. 1, 2024, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.
Weixiong Rao et al, "Optimal Resource Placement in Structured Peer-to-Peer Networks," IEEE Transactions on Parallel and Distributed Systems, vol. 21, No. 7, Jul. 2010, 16 pgs.
"Total Carbon Accounting: A Framework to Deliver Locational Carbon Intensity Data", White Paper, Nov. 2021, 29 pages.
Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 pp. 133-142.
Corrected Notice of Allowability, U.S. Appl. No. 15/004,757, Aug. 24, 2018, 4 pages.
Corrected Notice of Allowability, U.S. Appl. No. 15/174,850, Jul. 25, 2018, 37 pages.
Corrected Notice of Allowability, U.S. Appl. No. 16/194,240, Mar. 31, 2020, 6 pages.
Corrected Notice of Allowability, U.S. Appl. No. 16/430,336, Oct. 15, 2020, 2 pages.
Corrected Notice of Allowability, U.S. Appl. No. 16/565,247, Oct. 15, 2020, 10 pages.
Corrected Notice of Allowability, U.S. Appl. No. 16/917,800, Dec. 16, 2021, 2 pages.
Corrected Notice of Allowability, U.S. Appl. No. 16/917,800, Nov. 18, 2021, 2 pages.
Corrected Notice of Allowability, U.S. Appl. No. 16/917,800, Oct. 25, 2021, 2 pages.
Corrected Notice of Allowability, U.S. Appl. No. 16/943,291, Apr. 11, 2022, 2 pages.
Corrected Notice of Allowability, U.S. Appl. No. 16/943,291, Feb. 25, 2022, 2 pages.
Corrected Notice of Allowability, U.S. Appl. No. 16/943,291, Oct. 18, 2021, 5 pages.
Corrected Notice of Allowability, U.S. Appl. No. 17/683,213, Oct. 7, 2024, 2 pages.
Corrected Notice of Allowability, U.S. Appl. No. 17/683,213, Sep. 26, 2024, 2 pages.
Corrected Notice of Allowability, U.S. Appl. No. 18/099,854, Jun. 5, 2023, 7 pages.

(56) References Cited

OTHER PUBLICATIONS

Corrected Notice of Allowability, U.S. Appl. No. 18/225,620, Oct. 15, 2024, 2 pages.
Corrected Notice of Allowance, U.S. Appl. No. 18/516,882, Dec. 20, 2024, 5 pages.
Final Office Action, U.S. Appl. No. 13/084,923, Jul. 1, 2013, 10 pages.
Final Office Action, U.S. Appl. No. 15/004,757, Dec. 29, 2017, 27 pages.
Final Office Action, U.S. Appl. No. 15/215,474, Apr. 1, 2019, 7 pages.
Final Office Action, U.S. Appl. No. 15/668,665, Dec. 10, 2019, 13 pages.
Final Office Action, U.S. Appl. No. 15/702,617, Dec. 27, 2018, 54 pages.
Final Office Action, U.S. Appl. No. 16/952,009, Dec. 13, 2022, 9 pages.
Final Office Action, U.S. Appl. No. 17/732,402, Nov. 6, 2024, 21 pages.
Final Office Action, U.S. Appl. No. 18/196,980, Dec. 9, 2024, 26 pages.
Final Office Action, U.S. Appl. No. 18/196,980, Mar. 11, 2024, 22 pages.
H. Brendan Mcmahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Hood, Cynthhia S., Proactive Network-Fault Detection, Sep. 1997, IEEE Transactions on Reliability, vol. 46, No. 3, pp. 333-341.
Ian Goodfellow et al., "Deep Learning," 2016, 798 pages, MIT Press.
International Preliminary Report on Patentability, PCT App. No. PCT/US2013/076971, Jul. 2, 2015, 15 pages.
International Preliminary Report on Patentability, PCT App. No. PCT/US2014/067607, Jun. 9, 2016, 11 pages.
International Preliminary Report on Patentability, PCT App. No. PCT/US2015/020780, Oct. 6, 2016, 10 pages.
International Search Report and Written Opinion, PCT App. No. PCT/US2013/076971, Apr. 4, 2014, 17 pages.
International Search Report and Written Opinion, PCT App. No. PCT/US2014/067607, Feb. 18, 2015, 13 pages.
International Search Report and Written Opinion, PCT App. No. PCT/US2015/020780, Jul. 2, 2015, 13 pages.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Jae Woo Lee et al., "0 to 10k in 20 seconds: Bootstrapping Large-Scale DHT Networks," 2011 IEEE International Conference on Communications, Jun. 9, 2011, pp. 1-6.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology, Aug. 9-11, 2022, pp. 1-10.
Mongeau et al., "Ensuring integrity of network inventory and configuration data", Telecommunications Network Strategy and Planning Symposium, Networks 2004, 11th International Vienna, Austria, Jun. 13-16, 2004, 6 pgs.
Non-Final Office Action, U.S. Appl. No. 12/412,623, Mar. 7, 2011, 10 pages.
Non-Final Office Action, U.S. Appl. No. 13/084,923, Dec. 9, 2013, 13 pages.
Non-Final Office Action, U.S. Appl. No. 13/084,923, Feb. 14, 2013, 8 pages.
Non-Final Office Action, U.S. Appl. No. 13/107,625, Jan. 14, 2014, 9 pages.
Non-Final Office Action, U.S. Appl. No. 13/301,250, Jun. 26, 2013, 11 pages.
Non-Final Office Action, U.S. Appl. No. 13/797,946, Feb. 27, 2015, 18 pages.
Non-Final Office Action, U.S. Appl. No. 14/530,601, Nov. 10, 2016, 8 pages.
Corrected Notice of Allowance, U.S. Appl. No. 17/675,998, May 5, 2025, 2 pages.
Non-Final Office Action, U.S. Appl. No. 18/421,881, Mar. 21, 2025, 15 pages.
Notice of Allowance, U.S. Appl. No. 17/675,998, Jan. 22, 2025, 10 pages.
Notice of Allowance, U.S. Appl. No. 17/683,213, Apr. 9, 2025, 18 pages.
Notice of Allowance, U.S. Appl. No. 15/215,483, Jun. 7, 2018, 9 pages.
Notice of Allowance, U.S. Appl. No. 15/668,665, Mar. 2, 2020, 7 pages.
Notice of Allowance, U.S. Appl. No. 15/686,054, Jul. 18, 2018, 6 pages.
Notice of Allowance, U.S. Appl. No. 15/702,617, Apr. 23, 2019, 24 pages.
Notice of Allowance, U.S. Appl. No. 15/713,518, Apr. 10, 2019, 14 pages.
Notice of Allowance, U.S. Appl. No. 15/713,518, Jul. 29, 2019, 13 pages.
Notice of Allowance, U.S. Appl. No. 15/878,286, Apr. 25, 2019, 11 pages.
Notice of Allowance, U.S. Appl. No. 15/878,286, Jan. 10, 2020, 6 pages.
Notice of Allowance, U.S. Appl. No. 15/878,286, Jul. 31, 2019, 5 pages.
Notice of Allowance, U.S. Appl. No. 15/930,342, Mar. 24, 2022, 8 pages.
Notice of Allowance, U.S. Appl. No. 15/930,342, May 25, 2022, 9 pages.
Notice of Allowance, U.S. Appl. No. 16/033,131, Jun. 30, 2020, 27 pages.
Notice of Allowance, U.S. Appl. No. 16/194,240, Aug. 14, 2019, 10 pages.
Notice of Allowance, U.S. Appl. No. 16/194,240, Mar. 2, 2020, 9 pages.
Notice of Allowance, U.S. Appl. No. 16/194,240, Nov. 7, 2019, 10 pages.
Notice of Allowance, U.S. Appl. No. 16/430,336, Aug. 7, 2020, 28 pages.
Notice of Allowance, U.S. Appl. No. 16/430,336, Sep. 3, 2020, 5 pages.
Notice of Allowance, U.S. Appl. No. 16/443,720, Feb. 9, 2021, 8 pages.
Notice of Allowance, U.S. Appl. No. 16/443,720, Jun. 15, 2021, 7 pages.
Notice of Allowance, U.S. Appl. No. 16/532,391, Oct. 21, 2020, 10 pages.
Notice of Allowance, U.S. Appl. No. 16/565,247, Aug. 17, 2020, 19 pages.
Notice of Allowance, U.S. Appl. No. 16/854,844, Jul. 6, 2021, 16 pages.
Notice of Allowance, U.S. Appl. No. 16/870,742, Mar. 7, 2022, 10 pages.
Notice of Allowance, U.S. Appl. No. 16/917,800, Oct. 15, 2021, 7 pages.
Notice of Allowance, U.S. Appl. No. 16/943,291, Jan. 27, 2022, 12 pages.

(56) References Cited

OTHER PUBLICATIONS

Notice of Allowance, U.S. Appl. No. 16/943,291, Oct. 1, 2021, 11 pages.
Notice of Allowance, U.S. Appl. No. 16/943,307, Nov. 8, 2022, 11 pages.
Notice of Allowance, U.S. Appl. No. 16/943,307, Oct. 6, 2022, 12 pages.
Notice of Allowance, U.S. Appl. No. 16/952,009, Jul. 25, 2023, 8 pages.
Notice of Allowance, U.S. Appl. No. 16/952,009, Mar. 28, 2023, 8 pages.
Notice of Allowance, U.S. Appl. No. 17/001,586, Sep. 8, 2022, 8 pages.
Notice of Allowance, U.S. Appl. No. 17/129,638, Nov. 4, 2021, 9 pages.
Notice of Allowance, U.S. Appl. No. 17/182,083, Sep. 20, 2023, 8 pages.
Notice of Allowance, U.S. Appl. No. 17/503,023, Feb. 24, 2023, 8 pages.
Notice of Allowance, U.S. Appl. No. 17/521,686, Mar. 3, 2023, 8 pages.
Notice of Allowance, U.S. Appl. No. 17/683,213, Sep. 16, 2024, 18 pages.
Notice of Allowance, U.S. Appl. No. 17/751,504, Nov. 21, 2023, 12 pages.
Notice of Allowance, U.S. Appl. No. 17/856,787, Nov. 18, 2024, 10 pages.
Notice of Allowance, U.S. Appl. No. 17/959,177, Jun. 21, 2023, 9 pages.
Notice of Allowance, U.S. Appl. No. 17/959,177, Mar. 28, 2023, 9 pages.
Notice of Allowance, U.S. Appl. No. 18/099,854, May 26, 2023, 12 pages.
Notice of Allowance, U.S. Appl. No. 18/123,930, Nov. 7, 2023, 11 pages.
Notice of Allowance, U.S. Appl. No. 18/204,351, Jun. 21, 2024, 10 pages.
Notice of Allowance, U.S. Appl. No. 18/225,620, Jul. 18, 2024, 7 pages.
Notice of Allowance, U.S. Appl. No. 18/374,621, Oct. 30, 2024, 7 pages.
Notice of Allowance, U.S. Appl. No. 18/440,922, Oct. 29, 2024, 11 pages.
Notice of Allowance, U.S. Appl. No. 18/516,882, Dec. 18, 2024, 8 pages.
Peter Kairouz et al., "Advances and Open Problems in Federated Learning," 2021, 121 pages, arXIV:1912.04977v3.
Ping Wang et al., "Peer-to-Peer Botnets: The Next Generation of Botnet Attacks", Jan. 2010, pp. 1-25 (Year: 2010).
Requirement for Restriction/Election, U.S. Appl. No. 12/412,623, Nov. 22, 2010, 5 pages.

* cited by examiner

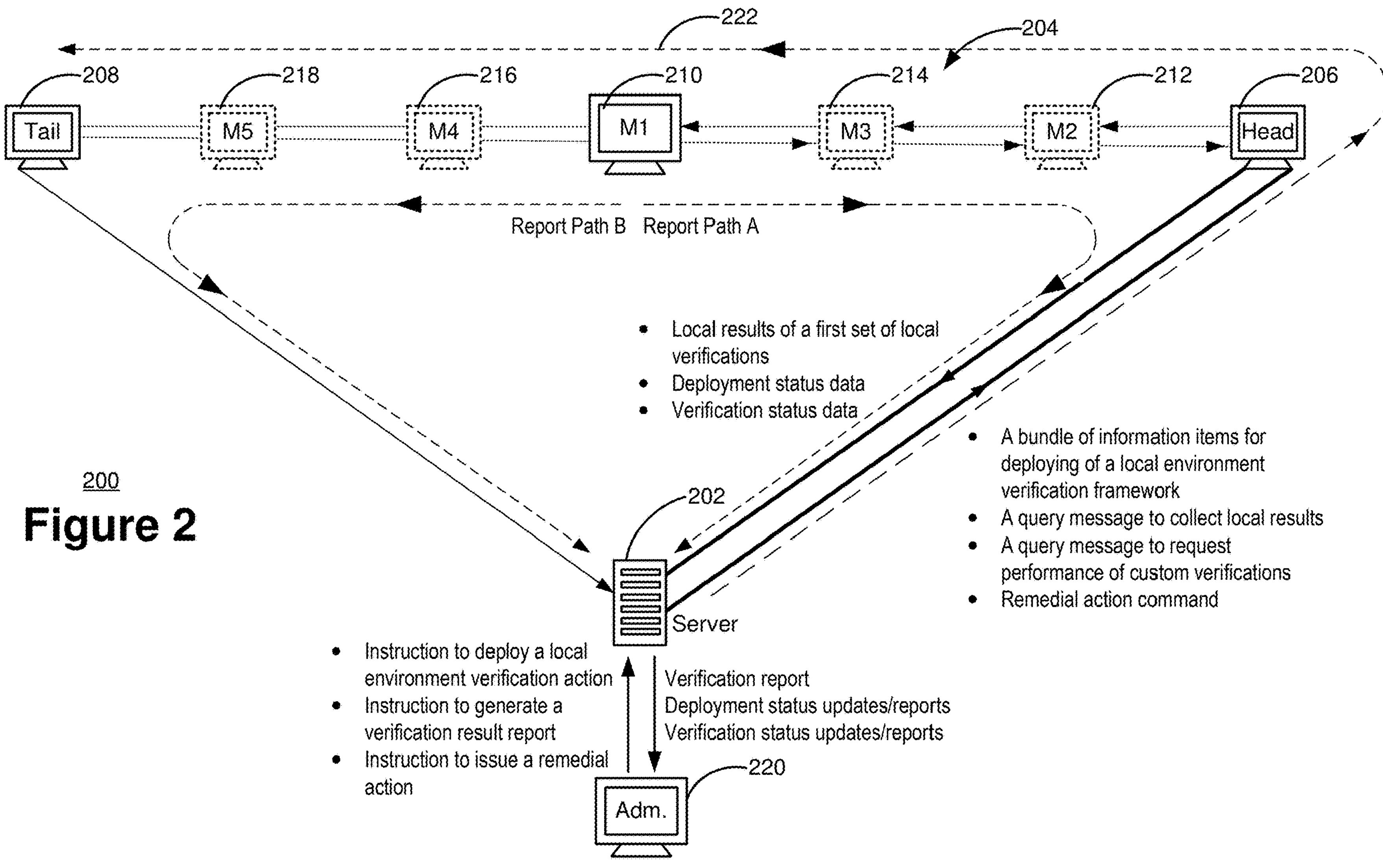

222
204
208
Tail
218
M5
216
M4
210
M1
214
M3
212
M2
206
Head
Report Path B
Report Path A
• Local results of a first set of local verifications
• Deployment status data
• Verification status data
• A bundle of information items for deploying of a local environment verification framework
• A query message to collect local results
• A query message to request performance of custom verifications
• Remedial action command
200
Figure 2
202
Server
• Instruction to deploy a local environment verification action
• Instruction to generate a verification result report
• Instruction to issue a remedial action
Verification report
Deployment status updates/reports
Verification status updates/reports
220
Adm.

First Information Item Request 506
208
Second Information Item Request 508
204
206
Tail
M5
218
M4
216
M1
210
M3
214
M2
212
Head
Second Shard 504
First Shard 502
To Server
500

Third Information Item Request 604
208
First Information Item Request 602
204
206
Tail
M5
218
M4
216
M1
210
M3
214
M2
212
Head
First Shard
600
To Server

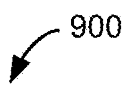
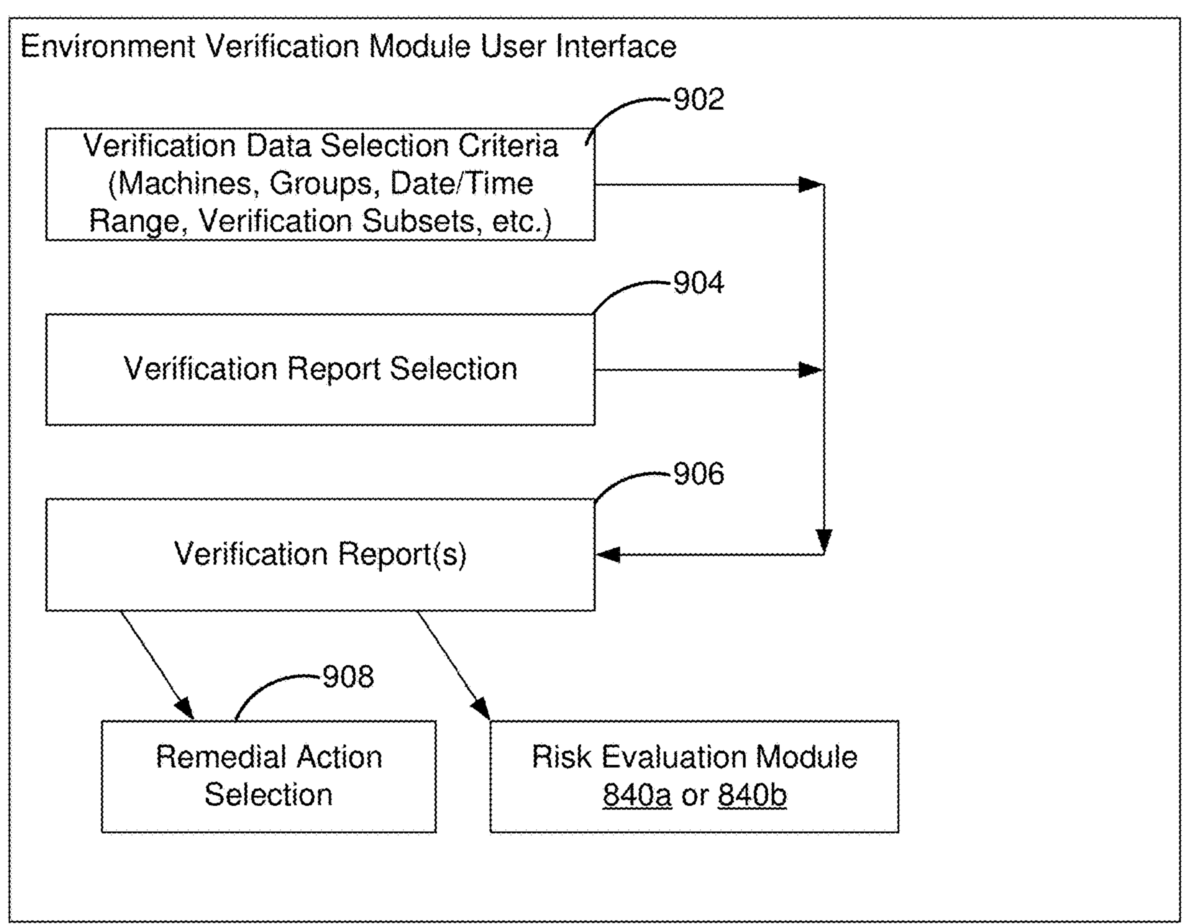
Figure 9

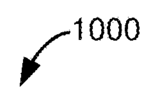
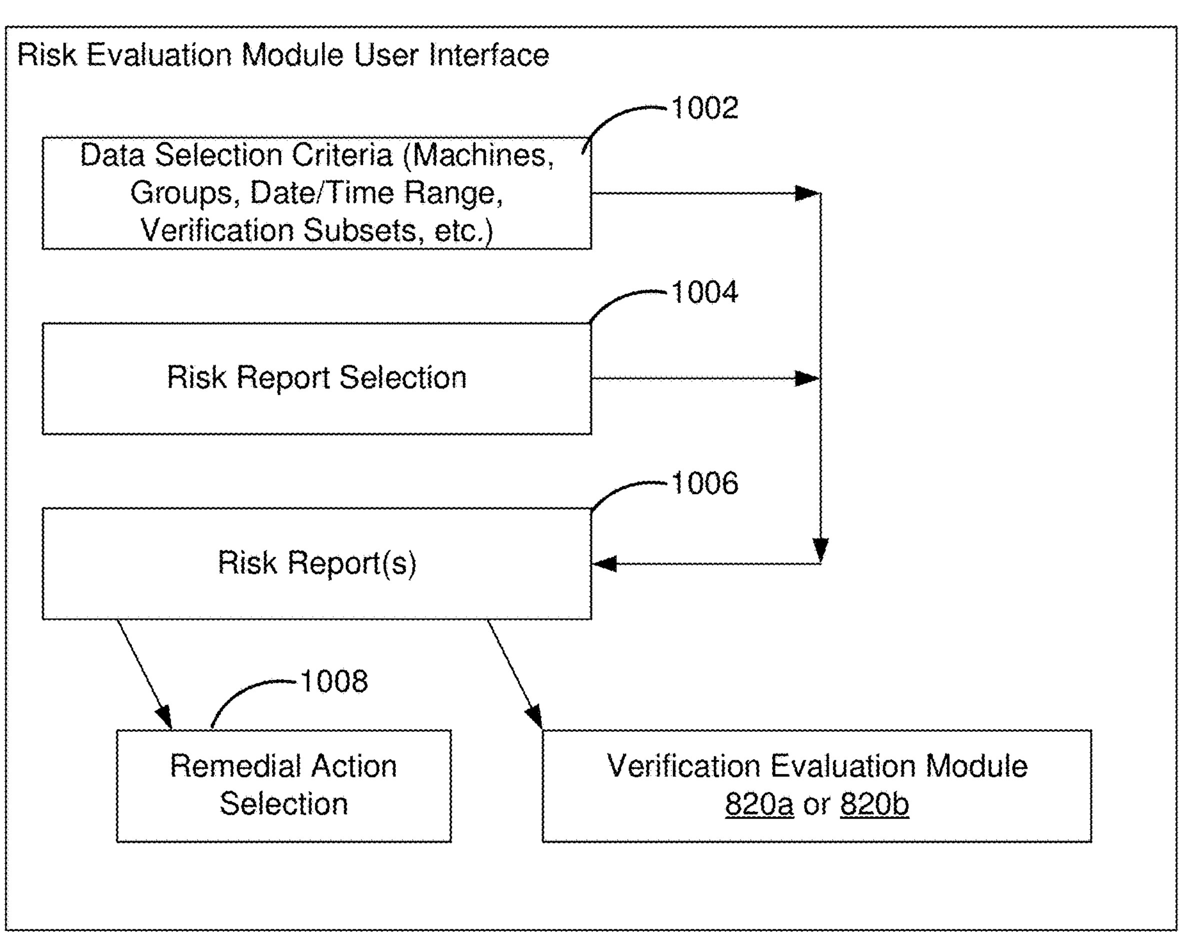
Figure 10

RISK SCORING BASED ON COMPLIANCE VERIFICATION TEST RESULTS IN A LOCAL NETWORK

RELATED APPLICATIONS

This application is a continuation of U.S. application Ser. No. 18/374,621, filed Sep. 28, 2023, which is a continuation of U.S. application Ser. No. 18/099,854, filed Jan. 20, 2023, now U.S. Pat. No. 11,777,981, which is a continuation of U.S. patent application Ser. No. 17/001,586, filed Aug. 24, 2020, now U.S. Pat. No. 11,563,754, which is hereby incorporated by reference in its entirety.

This application is related to U.S. patent application Ser. No. 16/033,131, filed Jul. 11, 2018, now U.S. Pat. No. 10,824,729, which is hereby incorporated by reference in its entirety.

This application is related to U.S. patent application Ser. No. 14/554,739, filed Nov. 26, 2014, now U.S. Pat. No. 9,769,275, which is hereby incorporated by reference in its entirety.

This application is related to U.S. patent application Ser. No. 14/554,711, filed Nov. 26, 2014, now U.S. Pat. No. 9,667,738, which is hereby incorporated by reference in its entirety.

This application is related to U.S. patent application Ser. No. 13/797,962, filed Mar. 12, 2013, now U.S. Pat. No. 9,059,961, U.S. Provisional Application Ser. No. 61/774,106, filed Mar. 7, 2013, and U.S. Provisional Application Ser. No. 61/745,236, filed Dec. 21, 2012, the entireties of which are hereby incorporated by reference.

This application is also related to U.S. patent application Ser. No. 12/412,623, filed Mar. 27, 2009, now U.S. Pat. No. 8,086,729, U.S. patent application Ser. No. 13/084,923, filed Apr. 12, 2011, now U.S. Pat. No. 8,904,039, and U.S. patent application Ser. No. 13/107,625, filed May 13, 2011, now U.S. Pat. No. 8,903,973. Content of each of the above applications is hereby incorporated by reference in its entirety.

BACKGROUND

There are many circumstances in which multiple computational machines (e.g., computers, but sometimes including other electronic devices, such as ATMs, point-of-sale machines (sometimes call cash registers), network connected controllers, etc.) on the same local area network (LAN) need to execute local environment verification tests (sometimes called a local environment verification framework) for checking their respective performance, security configurations, and vulnerability. Execution of the local environment verification framework oftentimes makes heavy use of both hardware (distributed file servers) and wide area network (WAN) bandwidth, for example, by having each computational machine on the local area network separately obtain a copy of a local environment verification framework from a resource external to the local area network and separately report verification results to a remote administrator machine. It would be beneficial to have a more efficient environment verification mechanism than the current practice.

In large corporate networks, and the networks of machines/computers used by large organizations, the numbers of managed machines can number in the tens or hundreds of thousands, or even more, making security assessment and management very challenging. Administrators are typically presented with an ever expanding list of machines that have failed various environment verification tests, as well as alerts about suspicious behavior and security risks to mitigate. Conventional methods typically only show how many systems are affected by a respective test failure, security configuration, vulnerability, alert or security risk, giving the system administrators little basis for prioritizing their efforts to mitigate or remediate security risks. Under traditional approaches, security risks that require the most attention may not be brought to the system administrator's attention, or their criticality may not be accurately indicated in the information presented to the system administrator(s).

SUMMARY

In one aspect, a method is performed at a server system in a computer network that has a plurality of nodes, where each said node includes a respective computational machine and has a respective defined location in a linearly ordered communication orbit that includes the plurality of nodes. The server system transmits, via the linearly ordered communication orbit, a set of local environment verification tests, to the computational machines at a first subset of nodes in the computer network. The server system also transmits, via the linearly ordered communication orbit, a set of mappings that map results of the local environment verification tests into a set of risk scores, to the computational machines at a first subset of nodes in the computer network. In addition, the server system transmits or sends, via the linearly ordered communication orbit, one or more requests to a plurality of the nodes in the first subset of nodes.

The one or more requests cause the computational machine at each respective node of the plurality of nodes in the first subset of nodes to: locally evaluate the set of local environment verification tests to produce test results for the computational machine at the respective node; locally map the test results using the set of mappings into a set of risk scores for the computational machine at the respective node; and locally store, at the computational machine at the respective node, the test results and risk scores.

Next, the server system sends or transmits, via the linearly ordered communication orbit, one or more queries to the plurality of nodes in the first subset of nodes. The one or more queries cause the computational machines at the plurality of nodes to return to the server system at least a portion of the test results and risk scores locally stored at the computational machines at the plurality of nodes, and the server system receives in response to the one or more queries, via the linearly ordered communication orbit, from the plurality of nodes, test results and risk scores sent by the computational machines at the plurality of nodes in response to the one or more queries. Further, the server system identifies, based on the received test results and risk scores, computational machines and/or control categories having risk scores satisfying predefined criteria.

In some embodiments, identifying the computational machines includes producing a listing of computational machines ordered in accordance with risks scores for those machines.

In some embodiments, identifying the computational machines includes producing, in accordance with the risk scores received from the plurality of nodes in the first subset of nodes, information identifying control categories, each corresponding to a subset of the set of local environment verification tests, having risk scores satisfying predefined criteria.

In some embodiments, identifying the computational machines includes combining, for each respective computational machine at the plurality of nodes, one or more predefined groups of the risk scores received from the respective computational machine, to produce one or more combined risk scores for the respective computational machine; and identifying, based on at least one of the combined risk scores, computational machines in at the plurality of nodes, having highest risk with respect to one or more control categories.

In some embodiments, the method includes providing, for an identified computational machine, information identifying control categories, each corresponding to a subset of the set of local environment verification tests, having risk scores satisfying predefined risk assessment criteria.

In some embodiments, the computational machines at the first subset of nodes are or include a first group of computational machines, and the method includes determining, by combining risk scores received from the computational machines in the first group of computational machines, combined risk scores for each of a plurality of control categories, each corresponding to a subset of the set of local environment verification tests; and providing, for the first group of computational machines, information identifying control categories of the plurality of control categories having combined risk scores satisfying predefined risk assessment criteria.

In some embodiments, the method includes automatically identifying, for a respective computational machine, or respective control category, one or more remedial actions; and in accordance with user selection of one or more of the identified one or more remedial actions, transmitting, via the linearly ordered communication orbit, to one or more of the computational machines at the first subset of nodes, instructions to execute the user-selected one or more remedial actions.

In another aspect of the invention, a non-transitory computer-readable medium, having instructions stored thereon, which when executed by one or more processors of a server system cause the server system to perform operations implementing any of the server-side methods described herein.

In another aspect of the invention, a server system in a computer network that has a plurality of nodes, wherein each said node comprises a respective computational machine and has a respective defined location in a linearly ordered communication orbit comprising said plurality of nodes, includes one or more processors, and memory storing one or more programs, the one or more programs including instructions, which when executed by the one or more processors cause the server system to perform operations implementing any of the server-side methods described herein.

In yet another aspect of the invention, a method is performed by each computation machine in a set of computational machines in a computer network that has a plurality of nodes, wherein each said node comprises a respective computational machine and has a respective defined location in a linearly ordered communication orbit comprising said plurality of nodes. The method performed by includes receiving, via the linearly ordered communication orbit, a set of local environment verification tests; receiving, via the linearly ordered communication orbit, a set of mappings that map results of the local environment verification tests into a set of risk scores; and receiving, via the linearly ordered communication orbit, one or more requests. The one or more requests cause the computational machine to locally evaluate the set of local environment verification tests to produce test results for the computational machine; locally map the test results using the set of mappings into a set of risk scores for the computational machine; and locally store, at the computational machine, the test results and risk scores. The method further includes, in response to receiving from a server system, via the linearly ordered communication orbit, one or more queries, sending, via the linearly ordered communication orbit, at least the portion of the test results and risk scores locally stored at the computational machine. The server system, identifies, based on the test results and risk scores sent by a plurality of the computational machines, computational machines and/or control categories having risk scores satisfying predefined criteria.

In another aspect of the invention, a non-transitory computer-readable medium, having instructions stored thereon, which when executed by one or more processors of a computational machine cause the computational machine to perform operations implementing any of the client-side methods described herein.

In another aspect of the invention, a computational machine in a computer network that has a plurality of nodes includes one or more processors; and memory storing one or more programs, the one or more programs including instructions, which when executed by the one or more processors cause the respective computational machine to perform operations implementing any of the client-side methods described herein.

Other embodiments and advantages may be apparent to those skilled in the art in light of the descriptions and drawings in this specification.

BRIEF DESCRIPTION OF THE DRAWINGS

FIG. 2 illustrates an example local environment verification system 200 that deploys a local environment verification framework on a linear communication orbit in accordance with some embodiments.

FIG. 9 schematically depicts examples of user interface components that together form a user interface (UI) 900 of an environment verification module, in accordance with some embodiments.

FIG. 10 schematically depicts examples of user interface components that together form a user interface (UI) 1000 of a risk evaluation module, in accordance with some embodiments.

Figure 11D:
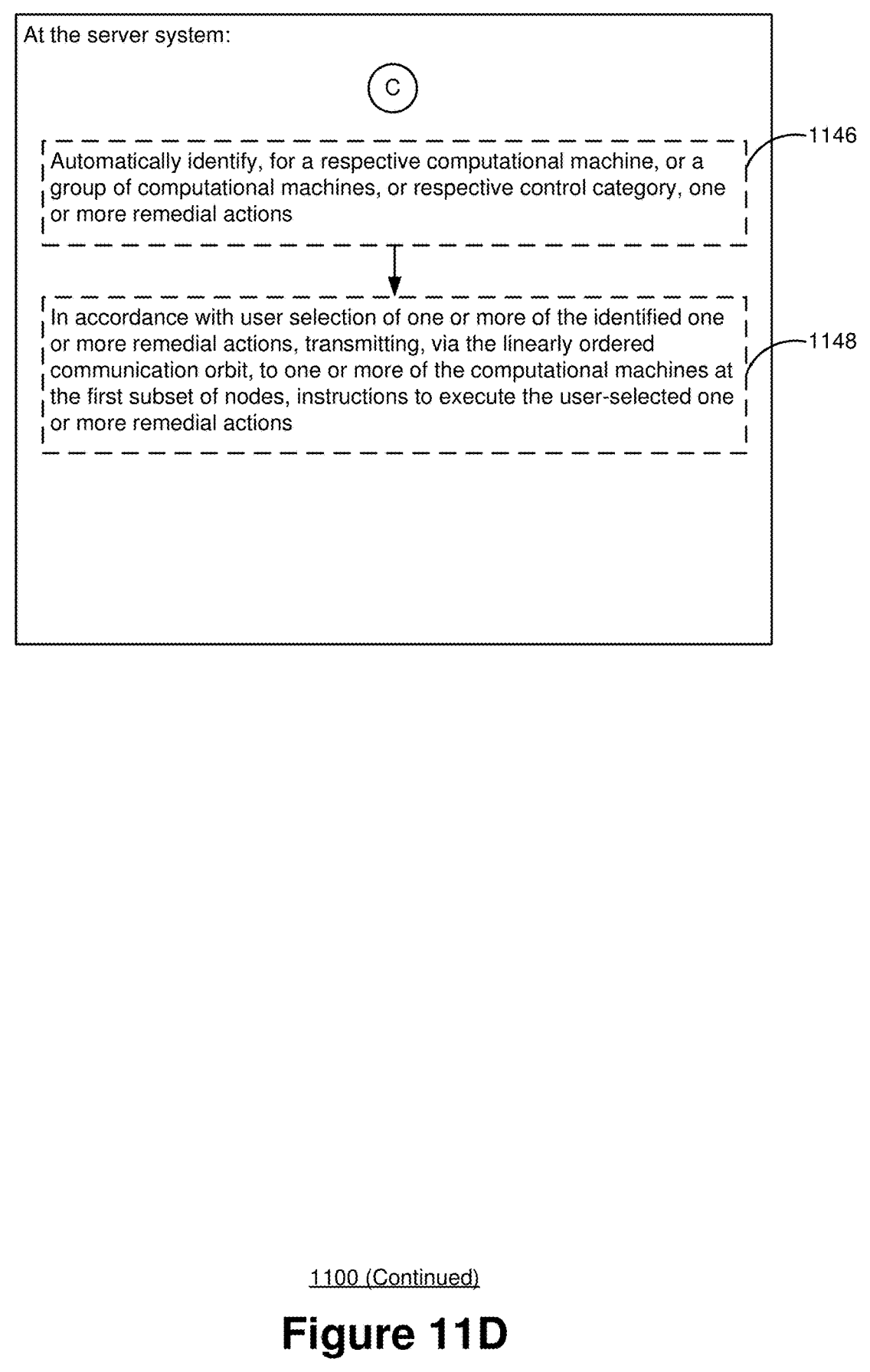

FIGS. 11A-11D include a flow diagram representing a method for identifying computational machines at nodes of a computer network, and/or control categories (corresponding to subsets of local environment verification tests performed by computational machines at nodes of the computer network), having risk scores satisfying predefined criteria, in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
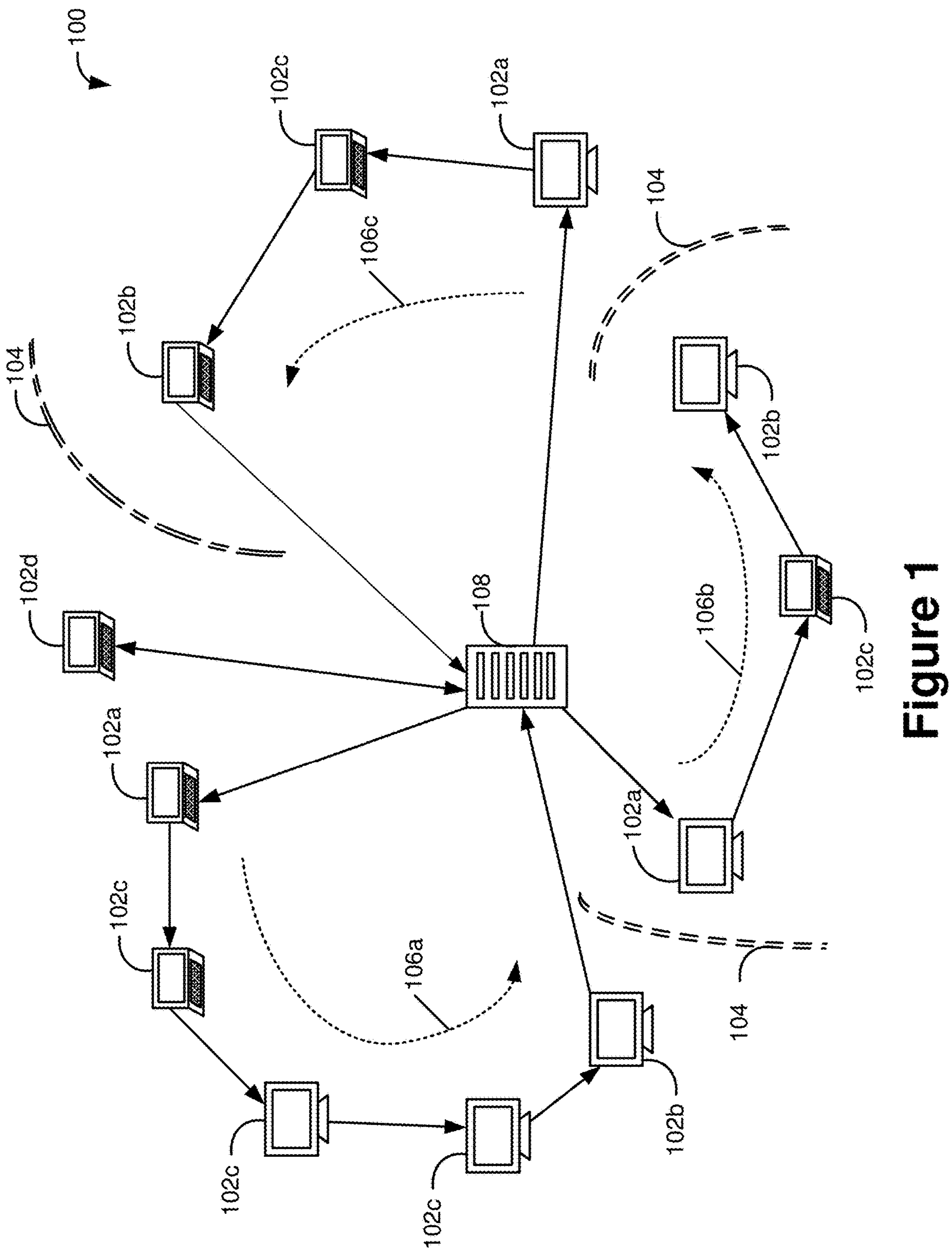
FIG. 1 illustrates a managed network comprising a plurality of interconnected machines, e.g., computers, servers, mobile devices, and other networked devices.

FIG. 1 illustrates a managed network 100 including a plurality of interconnected machines 102 (including 102*a*-*d*), e.g., computers, servers, mobile devices, and other networked devices. Examples of the managed network 100 include an enterprise network or another network under common management. The managed network 100 includes a plurality of sub-networks (e.g., contiguous segments 106, also herein called linear communication orbits 106), and optionally includes one or more singleton machines (e.g., singleton 102*d*). Each singleton machine or sub-network is coupled to a server 108 that facilitates creation, maintenance and operation of the respective singleton and sub-network. This server 108 may be elected automatically from among all or a subset of machines 102 according to various predetermined election rules implemented on machines 102. In some embodiments, server 108 is coupled to an administrator machine (e.g., administrator machine 220, FIG. 2) that presents user interfaces to allow an administrator user to provide instructions and receive feedback for identification, maintenance and operation of singleton machines and the creation, maintenance and operation of sub-networks of managed network 100. This administrator machine may also be elected automatically from all or a subset of machines 102 according to various predetermined election rules implemented on machines 102.

Each sub-network in managed network 100 includes at least two interconnected machines and adopts a certain network topology to organize these machines. Each singleton machine, if any, is a stand-alone node, except that it is coupled to server 108. In some embodiments, each singleton or sub-network is further separated from the rest of managed network 100 by one or more firewalls 104.

Optionally, machines 102 in managed network 100 are distributed across different geographical areas. Alternatively, machines 102 are located at the same physical location (e.g., the same building, or server farm). A respective machine 102 communicates with another machine 102 or the server 108 using one or more communication networks. Such communications include communications for performing normal operations (e.g., user-level operations, such as emailing, Internet browsing, VOIP, database accessing, etc.). The communication network(s) used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In an example, two or more machines 102 in a sub-network are coupled via a wired connection, while at least some machines in the same sub-network are coupled via a Bluetooth PAN.

Machines 102 in managed network 100 are organized into one or more contiguous segments 106 (e.g., continuous segments 106*a*, 106*b*, 106*c*), each of which becomes a sub-network in managed network 100. The number of contiguous segments 106 in network 100 may vary greatly from one embodiment to another, and in some embodiments network 100 includes hundreds or thousands of contiguous segments 106.

In some embodiments, each contiguous segment 106 is a respective linear communication orbit that supports system, security and network management communications within the managed network 100. Furthermore, each contiguous segment 106 includes one head node (e.g., head node 102*a*), one tail node (e.g., tail node 102*b*), and a sequence of zero or more intermediate client nodes (e.g., intermediate node(s) 102*c*) in between the head node and the tail node. In some embodiments, both the head node and tail node of a contiguous segment 106*a* are coupled to server 108, while the intermediate nodes of contiguous segment 106*a* are not coupled to server 108. In some embodiments, only the head node of a contiguous segment 106*b* is coupled to the server 108, while the intermediate nodes and tail node are not coupled to the server 108.

In some embodiments, all machines 102 coupled to a linear communication orbit 106 in network 100 are sorted into an ordered sequence according to a respective unique identifier associated with each machine 102. For example, respective IP addresses of machines 102 are used to sort the machines into an ordered sequence in the linear communication orbit. Each machine is provided with a predetermined set of rules for identifying its own predecessor and/or successor nodes given the unique identifiers of its potential neighbor machines. When a machine joins or leaves the linear communication orbit, it determines its ordinal position relative to one or more other machines in the linear communication orbit according to the unique identifiers and the aforementioned rules. More details on how a linear communication orbit is organized and how each intermediate node, head node or end node enters and leaves the linear communication orbit are provided in the Applicants' prior application, U.S. patent application Ser. No. 13/797,962, filed Mar. 12, 2013, entitled "Creation and Maintenance of Self-Organizing Communication Orbits in Distributed Networks," which is hereby incorporated by reference in its entirety.

Linear communication orbits, such as exemplary linear communication orbits 106*a*-106*c*, are established and maintained to facilitate system, security and/or network management operations ascribed to manual and programmed administration of network 100. Examples of system, security and network management operations include: (1) collecting status information (e.g., bandwidth, load, availability, resource inventory, application status, machine type, date of last update, security breach, errors, etc.) from individual machines of the managed network; (2) issuance of system, security and network management commands (e.g., commands related to shutdown, restart, failover, release of resources, change access authorizations, backup, deployment, quarantine, load balancing, etc.) for individual resources and/or machines on the managed network; (3) file distribution, including software installations and updates; (4) detecting presence of particular malicious programs (e.g., viruses, malware, security holes, etc.) on individual machines on the managed network; (5) removal of or disabling particular malicious programs (e.g., viruses, malware, security holes, etc.) on individual machines on the managed network; (6) disabling or suspending suspicious or high-risk operations and activities (e.g., Internet or operating system activities of suspected virus, malware, etc.) on particular machines on the managed network; (7) detecting unmanaged machines coupled to the managed network; (8) detecting data leakage (e.g., transmission of classified information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible, as will be apparent to those of ordinary skill in the art.

The present specification focuses on verifying local environments on individual computational machines 102 that are located at different client nodes of an established linear communication orbit, and mapping the results of those verifications, sometimes herein called benchmark results, test results, or local environment verification test results, into risk scores that can be used by a system administrator to prioritize system and networks vulnerabilities, corresponding to failed verifications at various computational machines, for further investigation and/or remediation. Such local environment verification operations include, for example, configuration compliance assessment, vulnerability scanning and management, and custom checks (e.g., checks on firewall, anti-virus capability, data encryption, governance, risk and compliance (GRC), etc.) within linear communication orbits 106*a*-106*c*. In an example, a local environment verification framework (e.g., a set of local environment verification tests) is deployed to a set of machines 102 on the linear communication orbits 106*a*-106*c* to verify enterprise-wide security configuration compliance. Optionally, the local environment verification framework includes standard security configuration benchmarks, such as those provided by Center for Internet Security (CIS), National Institute of Standards and Technology (NIST), Defense Information System Agency (DISA), International Organization for Standardization (ISO) and the International Electrotechnical Commission (IEC). These standard security configuration benchmarks fulfill system configuration hardening portions of some industry regulatory requirements, e.g., Payment Card Industry Data Security Standard (PCI DSS), Federal Information Security Management Act (FISMA), ISO/IEC 27002, Gramm-Leach-Bliley Act (GLBA), Sarbanes-Oxley Act of 2002 (SOX), and Health Insurance Portability and Accountability Act of 1996 (HIPAA). Alternatively, in some embodiments, customized security configuration benchmarks are created by customizing and/or augmenting standard security configuration benchmarks to meet specific internal requirements. When the standard or customized security configuration benchmarks are distributed to all or a subset of nodes on linear communication orbits 106*a*-106*c*, detailed endpoint assessment is implemented on selected machines 102 to meet specific external and internal requirements. Security configuration results of endpoint assessment can be automatically stored locally in the selected machines 102, and passed along linear communication orbits 106*a*-106*c* to return to a server 108 when a query message is received from server 108 to collect these security configuration results. In some embodiments, the security configuration results are aggregated and used to prepare for an audit to meet the external or internal security requirements.

The aforementioned benchmarks and local environment verification tests are numerous in number, and especially in networks having hundreds or thousands of computational machines on which such benchmarks or local environment verification tests are performed, tend to produce a huge quantity of test results that can be difficult for a system administrator to effectively review and use. This document presents systems and methods for assisting system administrators in reviewing and assessing benchmark results (also sometimes called local environment verification test results) for a large number of computational machines, by generating risk scores for categories of the local environment verification test results, and providing reports or visualization tools for prioritizing the computational machines and/or control categories (e.g., categories of local environment verification test results) that represent greatest risk to the computational machines and the distributed system in which those computational machines are resident. More detailed information about the mapping of local environment verification test results into risk scores, and about reports and visualization tools for presenting corresponding risk assessment information, are provided below with reference to FIGS. 8A-8C, 10, 11A-11D, and 12A-12B.

FIG. 2 illustrates an example local environment verification system 200 that deploys a local environment verification framework on a linear communication orbit in accordance with some embodiments. The local environment verification system 200 includes a server 202 (sometimes herein called a server system) and a linear communication orbit 204 that are coupled at a head node 206. In addition to head node 206, the linear communication orbit 204 further includes a tail node 208 and a plurality of intermediate machines (e.g., machines M1-M5) 210-218 which are coupled between head node 206 and tail node 208. While intermediate machines 210-218 illustrate the configuration of linear communication orbit 204, in some embodiments, linear communication orbit 204 includes only one intermediate machine, while in other embodiments, it includes dozens, hundreds or even thousands of intermediate machines.

Server 202 injects into linear communication orbit 204 a bundle of information items regarding deployment of a respective local environment verification framework at each of a first subset of nodes (e.g., at computational machine (M1) 210). Optionally, the bundle of information items includes a package of files containing one or more of a runtime environment, engines, benchmarks and vulnerability checks. Specifically, in some embodiments, the local environment verification framework includes a compliance verification framework and/or a vulnerability detection framework, and the bundle of information items regarding deployment of such a local environment verification framework includes one or more of a Java runtime environment, a compliance verification engine, a set of compliance benchmarks, and/or vulnerability checks that are to be executed at a predefined group of nodes (e.g., the first subset of nodes) in linear communication orbit 204. More specifically, in an example, the bundle of information items includes a Java runtime environment and a compliance verification engine, while the compliance benchmarks or vulnerability checks are distributed on the linearly ordered communication orbit with a subsequent query message that is injected into the linearly ordered communication orbit for executing local environment checks on the local environment verification framework or collecting local results thereof.

The bundle of information items is distributed to a respective node of the first subset of nodes through linear communication orbit 204, thereby allowing establishment of the respective local environment verification framework at the respective node of the first subset of nodes. The respective node of the first subset of nodes is configured to perform a first set of local environment verifications using the respective local environment verification framework that has been established at the respective node. In some embodiments, server 202 receives from an administrator machine 220 a first instruction to deploy the local environment verification framework to the first subset of nodes in linear communication orbit 204, and the bundle of information items regarding deployment of the respective local environment verification framework are injected into the linear communication orbit 204 in accordance with the instruction to deploy the local environment verification action. In some situations, the first instruction includes a batch size for running the first set of local environment verifications at a time. Server 202 prepares a corresponding bundle of information items by gathering content related to the first set of local environment verifications according to the batch size, before deploying the bundle of information items to the first subset of nodes.

In some embodiments, a computational machine, such as computational machine (M1) 210, is an intermediate machine located between head node 206 and tail node 208 of linear communication orbit 204. The bundle of information items is initially received at head node 206 of linear communication orbit 204, and then passed along linear communication orbit 204 to each node in linear communication orbit 204 until it reaches tail node 208 of linear communication orbit 204. When the bundle of information items is distributed to each computational machine, the respective computational machine determines whether the local environment verification framework needs to be deployed locally. For example, when the bundle of information items is distributed to computational machine (M1) 210, computational machine (M1) 210 determines that the local environment verification framework needs to be deployed at computational machine (M1) 210, and as result (e.g., in accordance with that determination), caches a copy of the bundle of information items while passing the bundle of information items further along linear communication orbit 204. Computational machine (M1) 210 then establishes the local environment verification framework locally based on the cached bundle of information items, and prepares to perform a first set of local environment verifications using the local environment verification framework.

Specifically, computational machine (M1) 210 may obtain part or all of the bundle of information items from server 202 via head node 206 when the local environment verification framework is deployed by server 202. The bundle of information items is divided into a plurality of file shards from which the bundle of information items are restorable. Server 202 sends the plurality of file shards to linear communication orbit 204. One or more copies of each file shard of the plurality of file shards are propagated from node to node along linear communication orbit 204 while the bundle of information items are being distributed to the first subset of nodes. Computational machine M1 located at one of the first subset of nodes collects all or a subset of the plurality of file shards, and assembles the collected shards into the bundle of information items after receiving each of the plurality of file shards through linear communication orbit 204.

Alternatively, in some embodiments, computational machine (M1) 210 receives an instruction to deploy the local environment verification framework, and the instruction includes a command to collect and install the bundle of information items regarding deployment of a local environment verification framework within linear communication orbit 204. The instruction to deploy the local environment verification framework is initially received at head node 206 of linear communication orbit 204, and then passed along linear communication orbit 204 to each node in linear communication orbit 204 until it reaches tail node 208 of linear communication orbit 204. The instruction is interpreted by each computational machine (e.g., computational machine (M1) 210) in the linear communication orbit, which determines whether that machine should execute the command. Alternately stated, the instruction, when interpreted by each computational machine in the linear communication orbit, determines whether that machine needs to obtain and/or install the bundle of information items regarding deployment of the local environment verification framework. If the particular machine determines that it needs to obtain and/or install the bundle of information items, it generates a plurality of data requests to request a plurality of shards, as described in more detail below. Each of the data requests is a request for a respective shard within linear communication orbit 204. Together the shards form, or can be combined to form the bundle of information items regarding deployment of a local environment verification framework at the particular machine 102. More details on how a bundle of information items is obtained from a linear communication orbit are provided in the Applicants' prior applications, U.S. patent application Ser. No. 14/554,711, filed Nov. 26, 2014, entitled "Local Data Caching for Data Transfers on a Network of Computational Devices," and U.S. patent application Ser. No. 14/554,739, filed Nov. 26, 2014, entitled "Data Caching and Distribution in a Local Network," both of which are hereby incorporated by reference in their entireties.

In some embodiments, after the local environment verification framework is deployed, server 202 sends a verification request to perform the first set of local environment verifications at the first subset of nodes, and a local environment verification action is then executed to run the first set of local environment verifications at each of the first subset of nodes (e.g., computational machine (M1) 210) of linear communication orbit 204. In some embodiments, the verification request includes one or more parameters for performing the first set of local environment verifications at the first subset of nodes. Specifically, in some embodiments, the one or more parameters include one or both of: a schedule by which the first set of local environment verifications is to be executed at the first subset of nodes, and a time interval during which the first set of local environment verifications is to be completed at the first subset of nodes. Further, in some implementations, the one or more parameters include one or both of a selection of the first set of local environment verifications from a full set of local environment verifications included in the bundle of information items, and a batch size indicating a number of verification operations in the first set of local environment verifications that are to be executed as a batch (where execution of the first set of local environment verifications is divided into batches that are executed in sequence in accordance with a schedule). These parameters are used to control the number, the frequency and the schedule of the first set of environment verifications executed at individual computational machines of linear communication orbit 204, avoiding excessive consumption of computational and storage resource on these individual computational machines by the first set of local environment verifications.

After the local environment verification action is executed, results of the first set of local environment verifications are stored locally at the respective node of the first subset of nodes, and await to be collected by server 202. Then, server 202 injects a query message to collect the respective local results of the first set of local environment verifications from each of the first subset of nodes. In some embodiments, the query message is injected by server 202 in accordance with a second instruction received from the administrator machine 220 to generate a report regarding execution of the local environment verification action at the first subset of nodes. In some embodiments, the second instruction specifies a time interval for reissuing the query message to collect the respective local results of the first set of local environment verifications from the first subset of nodes. For example, the query message may be reissued once per minute, or other specified time interval, until all nodes in the first subset of nodes have reported a complete set of results for the first set of local environment verifications, or alternatively until either all nodes in the first subset of nodes have reported a complete set of results or a time limit or other termination condition is reached.

The query message for collecting local results is forwarded from node to node along linear communication orbit 204. The respective node of the first subset of nodes, in response to receiving the query message through the linear communication orbit 204, sends the respective local results of the first set of local environment verifications that have been obtained at the respective node to server 202 through linear communication orbit 204. For example, computational machine (M1) 210 receives the query message from server 202 via head node 206, and sends its local results of the first set of local environment verifications to server 202 along a report path A or a report path B. Report path A extends to server 202 via head node 206 and has a direction reverse to that of a query message path 222 along which the query message is passed along linear communication orbit 204. Report path B extends to server 202 via tail node 208 and has a direction consistent to that of the query message path 222. In some embodiments, when the local results of the first set of local environment verifications generated by computational machine (M1) 210 passes an intermediate machine (e.g., computational machine (M2) 212) on report path A or B, the local results generated by the intermediate machine are combined with the local results generated by computational machine M1 to produce a combined local results message (also called a response message) that is sent to server 202 along the same report path. Further, in some embodiments, after receiving the local results of the first subset of local environment verifications from the first subset of nodes in the computer network, server 202 generates a report on the local results of the execution of the first set of local environment verifications at the first subset of nodes, and provides the report to a user.

Further, in some embodiments, in accordance with the local results of the first set of local environment verifications, server 202 determines to execute a remedial action at the first subset of nodes in the network, and thereby sends a remedial action command to the first subset of nodes via linear communication orbit 204. Optionally, server 202 receives from administrator machine 220 a third instruction to issue the remedial action command to the respective node of the first subset of nodes. In some embodiments, the remedial action command includes one or more software patches to be installed on the respective node of the first subset of nodes to overcome security vulnerabilities detected via the first set of local environment verifications. In some embodiments, the remedial action command includes a warning message to be communicated to a user of the respective node of the first subset of nodes to perform one or more remedial actions (e.g., change computational machine's settings or configuration to require authentication on computational machine power on, resume or wake).

In some embodiments, deployment status data are sent to server 202 from the first subset of nodes through the linear communication orbit 204. The deployment status data includes respective messages from one or more nodes in the first subset of nodes indicating status of establishment of the respective local environment verification framework at the one or more nodes. In accordance with the received deployment status data, server 202 may provide real-time deployment progress updates to a user while the local environment verification framework is being deployed on linear communication orbit 204. Additionally, server 202 may also provide a deployment status summary report indicating whether deployment of the local environment verification framework has been completed successfully or unsuccessfully at the end of the deployment. Similarly, in some embodiments, verification status data is also sent to server 202 from the first subset of nodes through linear communication orbit 204. The verification status data includes respective messages from one or more nodes in the first subset of nodes indicating completion status of the first set of local environment verifications at said one or more first subset of nodes. In accordance with the received verification status data, server 202 may provide real-time action progress updates to a user (e.g., a user of an administrator machine) while the first set of local verifications are being executed by computational machines at endpoint nodes of linear communication orbit 204. Additionally, server 202 may also provide a verification status summary report indicating whether the first set of local verifications is completed successfully or unsuccessfully at the end of the corresponding local environment verification action. It is noted that deployment or verification status data are also passed from any of the first subset of nodes (e.g., computational machine (M1) 210) to server 202 along report path A or B, along which the local results of the first set of local environment verifications are collected from the respective node of the first subset of nodes.

Figures 3A, 3B:
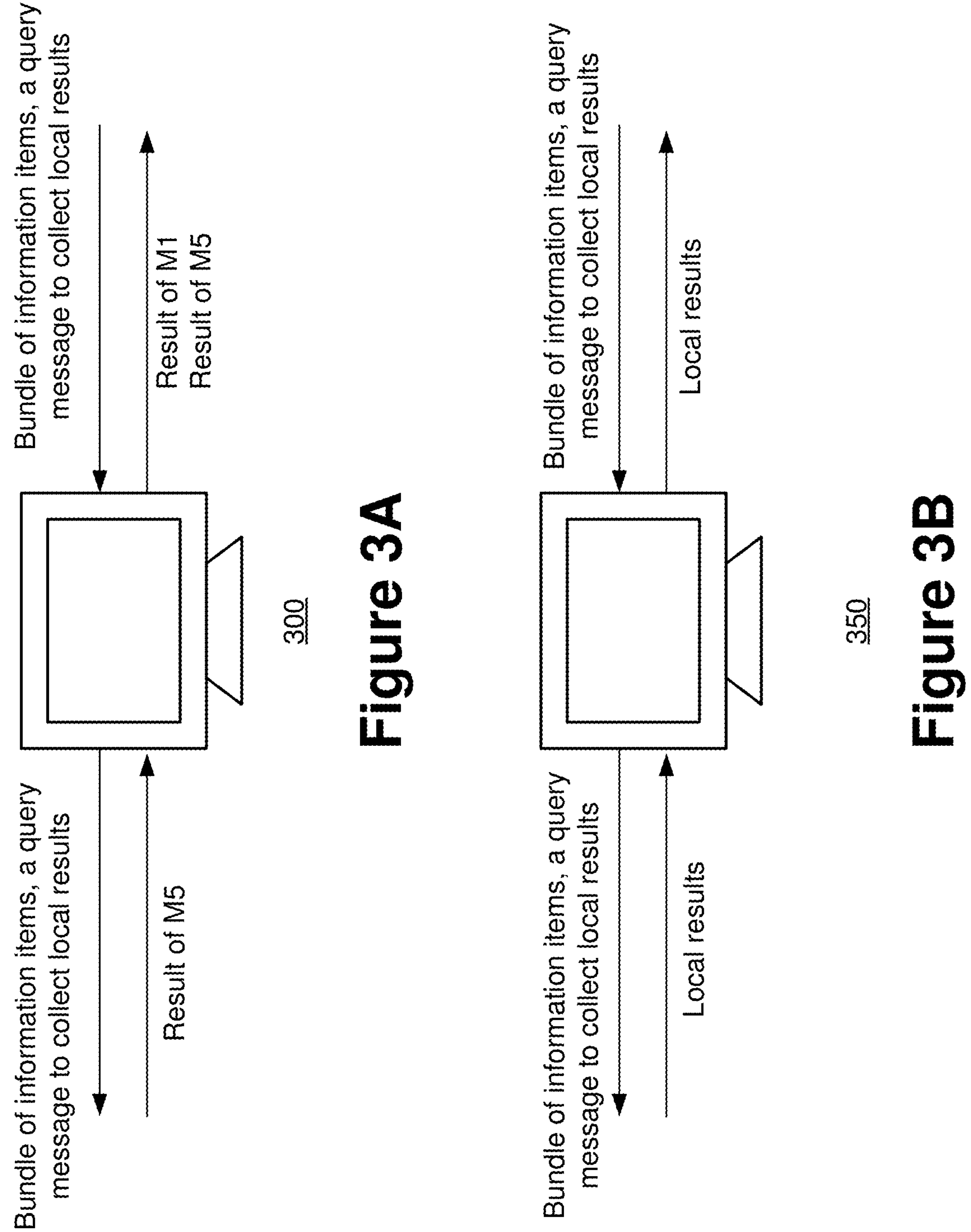
FIG. 3A illustrates an example computational machine that executes a local environment verification action in accordance with some embodiments.
FIG. 3B illustrates an example intermediate computational machine that responds to a local environment verification action in accordance with some embodiments.

FIG. 3A illustrates an example computational machine 300 (e.g., computational machine (M1) 210 in FIG. 2) that executes a local environment verification action in accordance with some embodiments. Machine 300 receives a bundle of information items regarding deployment of the local environment verification framework through linear communication orbit 204. Optionally, computational machine 300 obtains part or all of the bundle of information items from server 202 via one of its neighboring nodes when the local environment verification framework is deployed by server 202. Specifically, machine 300 determines that it needs to establish the local environment verification framework, and stores a copy of the part or all of the bundle of information items when the bundle of information items are distributed to machine 300 along linear communication orbit 204.

Alternatively, in some embodiments, machine 300 receives a command to collect and install the bundle of information items regarding deployment of a local environment verification framework with linear communication orbit 204. The bundle of information items has been divided into a plurality of file shards from which the bundle of information items are restorable. In some embodiments, the received command includes a manifest or listing of the information items to be installed and a listing or other identification of the shards into which the bundler of items has been divided. If machine 300 determines that it needs to obtain and/or install the bundle of information items, it generates a plurality of data requests to request the plurality of shards associated with the bundle of information items from other machines in linear communication orbit 204. If machine 300 already has some of the shards, it generates requests only for the shards it needs. In some embodiments, the plurality of shards are collected by machine 300 from two or more distinct machines on linear communication orbit 400. Over time, as machine 300 and other machines in the communication orbit 204 request the shards for the bundle of items, many of the shards will be locally cached at various machines in linear communication orbit 400. In some embodiments, one or more of the plurality of shards is collected from the server 202 because none of the computational machines in linear communication orbit 204 has a copy of those shards. Together the shards form, or can be combined to form the bundle of information items regarding deployment of the local environment verification framework at machine 300.

In some embodiments, machine 300 receives a query message from one of its two neighboring machines on linear communication orbit 204, and passes the query message to the other of its two neighboring machines. The query message is injected into linear communication orbit 204 to collect respective local results of the first set of local environment verifications from the first subset of nodes. When machine 300 determines that it is one of the first subset of nodes that needs to report its local results of the first set of local environment verifications, it provides its local results to either one of the neighboring machines, which subsequently passes the local results of machine 300 to server 202 in accordance with report path A or B as shown in FIG. 2. In some embodiments, machine 300 (e.g., machine (M1) 210) combines its own local results with local results of one or more other computational machines (e.g., machine (M5) 218) on linear communication orbit 204, and sends the combined local results to one of its neighboring machines (e.g., machine (M3) 214) in accordance with report path A or B. In some embodiments, each machine with local results to report in response to the query adds its results to a payload portion of the query message before passing the query message to a next node in the linear communication orbit.

FIG. 3B illustrates an example intermediate computational machine 350 that does not install the local environment verification framework, but nonetheless plays an important role in the distribution of information items and queries to other computational machines on the same linear communication orbit as computational machine 350, Computational machine 350 receives one or more shards of the bundle of information items directly from server 202 or indirectly from server 202 via one of its neighboring nodes, after the local environment verification action is deployed by server 202. In some embodiments, if machine 350 determines that it does not need to install the local environment verification framework, it forwards the one or more shards of the bundle of information items to its other neighboring machine, and does not store a copy of the shards of the bundle of information items. Conversely, in some embodiments, machine 350 locally stores a copy of one or more shards of the bundle of information items, even if machine 350 determines that it does not need to install the local environment verification framework. The local copy of one or more shards of the bundle of information items (i.e., shards of the bundle of information items) is subsequently provided to computational machines of linear communication orbit 204 that send data requests to request such shards from linear communication orbit 204.

In some embodiments, machine 350 receives a query message from one of its two neighboring machines (which we can call a first neighboring machine for convenience) on linear communication orbit 204, and passes the query message to the other of its two neighboring machines (which we can call the other neighboring machine). The query message is injected into linear communication orbit 204 to collect respective local results of the first set of local environment verifications from the first subset of nodes. When machine 350 determines that it is not one of the first subset of nodes that need to report local results of the first set of local environment verifications, it forwards or passes local results received from the first neighboring machine (the one that sent the query to Machine 350) to the other one of the two neighboring machines, which subsequently passes the received local results to server 202 in accordance with report path A or B as shown in FIG. 2. The local results passed by machine 350 to a neighboring machine are local results that were generated by one or more computational machines in the first subset of nodes on linear communication orbit 204 that deploy the local environment verification framework.

As explained above, in some embodiments, server 202 divides the bundle of information items into a plurality of file shards from which the bundle of information items are restorable, and sends the plurality of file shards to linear communication orbit 204. Subsequently, when a computational machine is instructed to deploy the local environment verification framework, it collects one or more file shards associated with the bundle of information items from other computational machines in the linear communication orbit.

Figure 4:
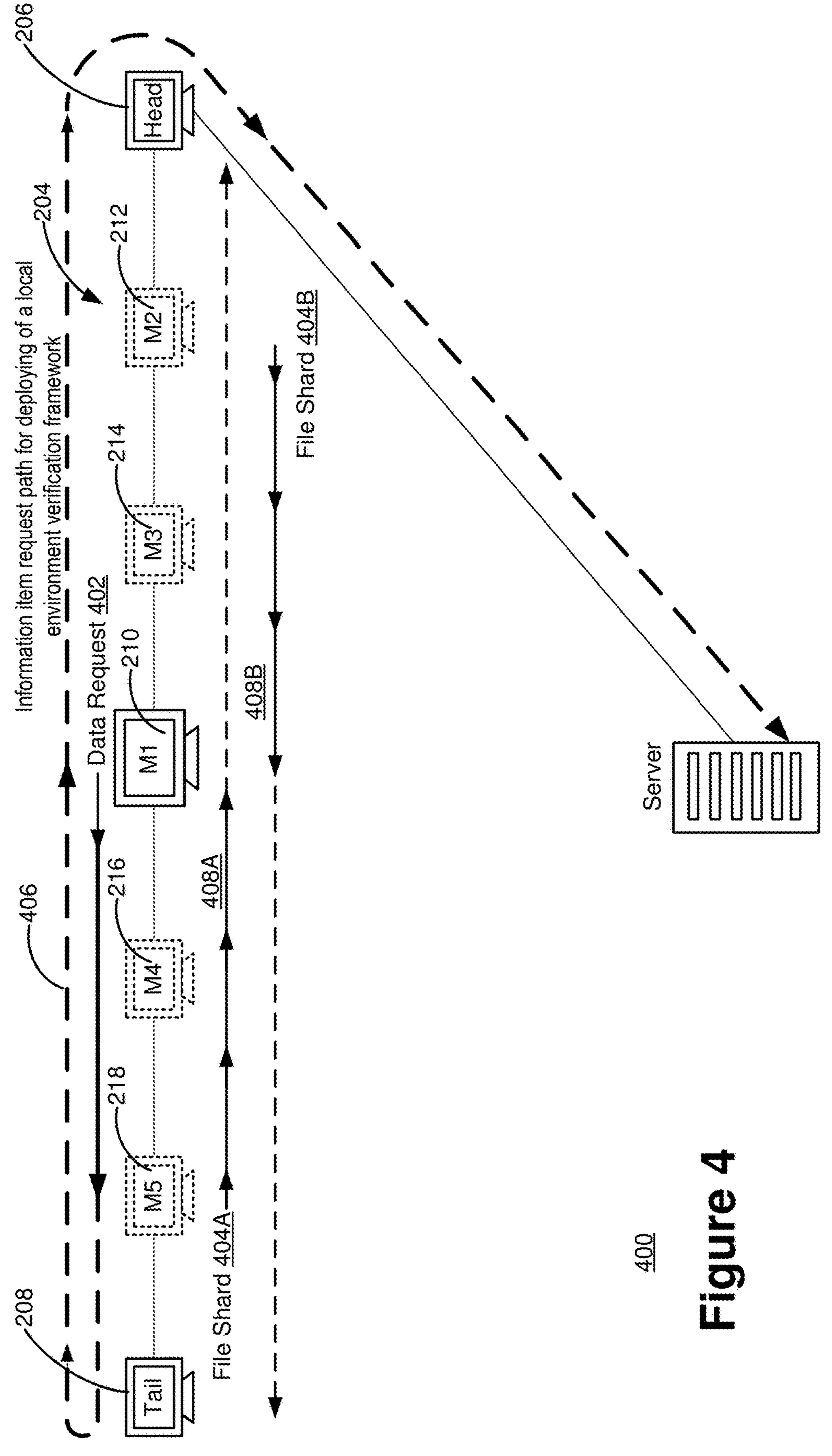
FIG. 4 illustrates an example linear communication orbit that transfers a data request and distributes a specific file shard for deploying a local environment verification framework to a computational machine in accordance with some embodiments.

FIG. 4 illustrates an example linear communication orbit 400 that transfers a data request 402 and distributes a specific file shard 404 for deploying a local environment verification framework to a computational machine (e.g., machine (M1) 210) in accordance with some embodiments. To deploy the local environment verification framework to machine (M1) 210, server 202 sends to machine M1 a command to collect and install the bundle of information items regarding deployment of the local environment verification framework. In response to the command, machine (M1) 210 generates one or more data requests (e.g., data request 402) to request one or more file shards (e.g., file shard 404) from computational machines on linear communication orbit 204. Each of the data requests is a request for respective specific data (also called a shard). Together the shards form, or can be combined to form the bundle of information items regarding deployment of a local environment verification framework at machine M1.

Data request 402 originates from requester machine (M1) 210, and travels along at least a part of a data request path 406. In this example, data request path 406 originates from requester machine (M1) 210, extends along a forward communication channel of linear communication orbit 204, reaches tail node 208, reverses to follow a backward communication channel, reaches at head node 206, and if needed, extends to server 202. In some embodiments, in response to data request 402, requested file shard 404 is identified in a machine located on the data request path 406, and returned to requester machine (M1) 210 along a data return path 408 that varies according to the location of the machine having requested file shard 404. In some embodiments or in some circumstances (e.g., when the requester machine is an end node of linear communication orbit 204), data return path 408 extends from the location of the machine having the requested file shard to one of the two end nodes, tail node 208 and head node 206, of linear communication orbit 204.

In some embodiments, a cached copy of the requested file shard is identified in machine (M5) 218 located downstream of requester machine M1, and therefore, the data request 402 ceases to be passed to machines on the rest of data request path 406. In this circumstance, the requested file shard 404A is returned from machine M5 to machine M1 along a data return path 408A. As explained in more detail elsewhere, if head node 206 has also requested the same file shard 404A, data return path 408*a* may extend between data machine M1 and head node 204. Alternatively, in some embodiments, a cached copy of the requested file shard is identified in machine M2 located upstream of requester machine M1. The data request 402 ceases to be passed further upstream beyond machine M2, and the requested file shard 404A is returned from machine M2 to machine M1 along a data return path 408B. If tail node 208 has also requested the same file shard, return path 408B may extend between machine M1 and tail node 208.

In some embodiments or in some circumstances, data request 402 is transferred along data request path 406 until it reaches head node 206. In this example, no cached copy of the file shard 404 is identified in any computational machine within linear communication orbit 204. Therefore, head node 206 passes data request 402 to server 202 which provides the requested file shard to head node 308. Once it receives the specific data from server 314, head node 206 stores a copy of the requested file shard 404 and returns it along a data return path 408 that extends between head machine 206 and tail node 208, thereby delivering the copy of the requested file shard to machine M1.

Figures 5, 6:
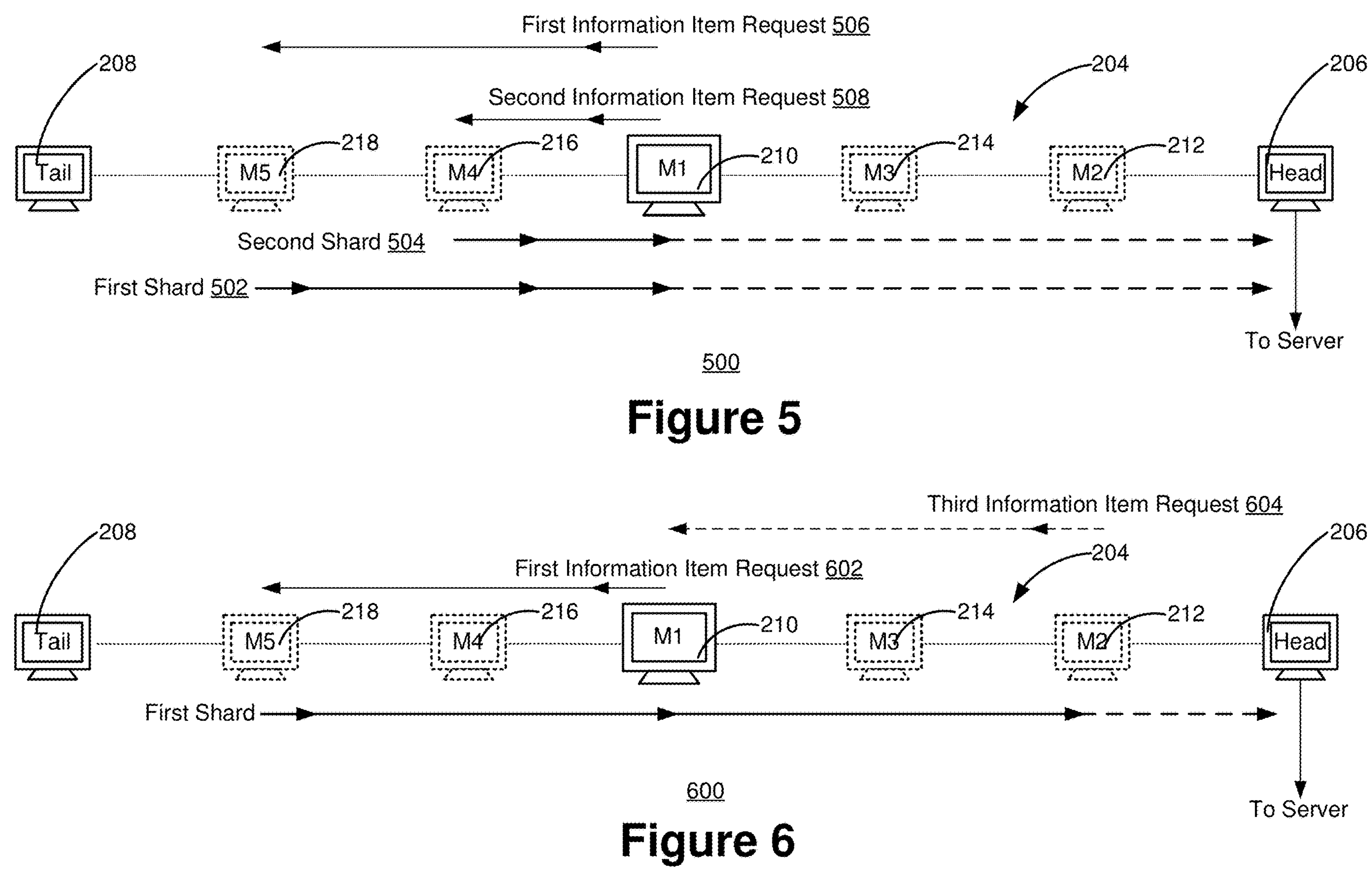
FIG. 5 illustrates an example process of providing file shards to a computational machine on a linear communication orbit in accordance with some embodiments.
FIG. 6 illustrates an example process of consolidating data requests issued by two distinct computational machines to request the same file shard for deploying a local environment verification framework on a linear communication orbit in accordance with some embodiments.

FIG. 5 illustrates an example process 500 of providing file shards to a computational machine M1 on a linear communication orbit in accordance with some embodiments. Machine M1 receives a command to collect and install the bundle of information items regarding deployment of a local environment verification framework. The command is issued from a server and passed from another computational machine (e.g., a neighboring machine of machine M1) in the same linear communication orbit. According to the command, computational machine M1 needs to obtain a plurality of file shards, including a first file shard 502 and a second file shard 504, that together constitute an object to be installed or updated on computational machine M1 for deployment of a local environment verification framework. Therefore, computational machine M1 generates a plurality of data requests, including a first data request 506 and a second data request 508, for requesting some of the plurality of file shards from other machines on linear communication orbit 204. Each data request is sent by requester machine M1, and transferred along a respective information item request path 406. In response to each data request, the corresponding file shard is identified in a computational machine on linear communication orbit (e.g., file shards 502 and 504 are identified in machines M5 and M4, respectively), and returned to requester machine M1 along a respective data return path. More details on data requests, data caching and data distribution associated with an individual data request are explained above with reference to FIG. 4.

In some embodiments as shown in FIG. 5, although the two data requests originate from the same requester machine M1, their corresponding file shards are identified in different computational machines on linear communication orbit 204. Alternatively, in some embodiments or in some circumstances not shown in FIG. 5, the two data requests originate from the same requester machine M1, and their corresponding file shards are also identified in the same computational machine on linear communication orbit 204. After requester machine M1 collects the plurality of data shards in the object that needs to be installed or updated, requester machine M1 then combines the plurality of file shards to generate or reconstitute the object regarding deployment of the local environment verification framework according to the command received for collecting and installing the corresponding bundle of information items.

In many embodiments, multiple machines on linear communication orbit 204 (including machine M1) concurrently (i.e., during overlapping time periods) generate requests for the same shards of the same object regarding deployment of the local environment verification framework that needs to be installed or updated on these computational machines. As a result, machines in the linear communication orbit 204 could be flooded with a large number of data requests in a short period of time. Therefore, in some embodiments, at least some of these machines delay generating their respective data requests for file shards to avoid generating data requests for the same file shards within a short period of time. This allows data requests to be combined, and local caches of machines on linear communication orbit 204 to be gradually populated with the requested file shards in response to the same command associated with deployment of the local environment verification framework.

FIG. 6 illustrates an example process 600 of consolidating data requests issued by two distinct computational machines to request the same file shard for deploying a local environment verification framework on a linear communication orbit in accordance with some embodiments. In some embodiments, a server 202 sends a command that results in an identical object regarding deployment of a local environment verification framework being installed or updated on more than one computational machine on linear communication orbit 204. Different computational machines (e.g., machines M1 and M2) issue respective data requests to request the same specific data that constitute a shard of a bundle of information items regarding deployment of the local environment verification framework. In some embodiments, the respective data requests are generated in an asynchronous manner (e.g., offset by a duration of time less than a request threshold duration). Consolidation of such data requests helps avoid repetitive data request processing and redundant data caching.

In one example, requester machines M1 and M2 that request the same file shard receive a copy of the requested file shard from the same data machine M5, and share at least a part of their respective data request path. In some embodiments, data machine M5 is located downstream of both machines M1 and M2, while in other embodiments, data machine M5 is located upstream of both machines M1 and M2. However, in some embodiments, data machine M5 is located between machines M1 and M2, in which case machines M1 and M2 have non-overlapping data request paths and each directly obtains the copy of the specific data from data machine M5.

In some embodiments, a computational machine consolidates the data requests that separately originate from machines M1 and M2, when it determines that predefined criteria in a request consolidation method are satisfied for the data requests. In one example, the computational machine is one of requester machine M1, requester machine M2 or an intermediate machine that is located on an overlapping part of the corresponding data request paths of the data requests. Upon a determination that the criteria in the request consolidation method are met, the computational machine forgoes passing one of the data requests along at least a part of its respective data request path. In accordance with some example criteria in the request consolidation method, the computational machine determines whether another data request has been previously generated or processed to request the same specific data during a predetermined period of time. The period of time expires when the corresponding specific data are returned, or an expiration time (e.g., a predetermined amount of time after the request is generated or transferred to a next machine along the data request path) is reached.

As shown in FIG. 6, two computational machines M1 and M2 respectively generate a first data request 602 and a third data request 604 to request the same file shard of the bundle of information items regarding deployment of a respective local environment verification framework. In some circumstances, the third data request 604 is generated at machine M2 after the first data request 602 has been generated and passed to a next machine on the data request path by machine M1. Thus, when the third data request 604 reaches machine M1, machine M1 detects a retained tracking record for the first data request 602, and based on that information, forgoes sending the third data request 604 to a next machine on the data request path. Machine M1 waits for the corresponding file shard to be returned in response to the first data request 602, and uses the same file shard to satisfy the third data request 604. Alternatively, in certain circumstances, the first data request 602 is generated at machine M1 after the third data request 604 has been generated by machine M2 and passed to a next machine on the data request path by machine M1. Based on a tracking record for the third data request, the first data request is not passed by machine M1 to a next machine along the data request path.

More generally, each machine that issues or passes a data request retains a tracking record of the request until a response with the request file shard is received, at which point the tracking record is either removed or marked as no longer pending. If a subsequent request is received after the earlier request has received a response, then the processing of the later data request is not impacted by the earlier request, except that the specific data required to respond to the later request is likely to be locally cached by at least one machine in the linear communication orbit 204.

When a machine collects from linear communication orbit 204 all the file shards that constitute the bundle of information items regarding deployment of the local environment verification framework, the local environment verification framework is established at a respective node of a computer network corresponding to the machine in accordance with the bundle of information items. The machine then performs a first set of local environment verifications using the local environment verification framework. Results from the first set of local environment verifications are stored locally in a memory of the machine, and await collection from the memory of the machine in response to a query message that is sent by a server to collect local results from a first subset of machines on linear communication orbit 204, including the machine on which the local environment verification framework has been established.

In many embodiments, multiple machines on linear communication orbit 204 (including machine M1) concurrently (i.e., during overlapping time periods) execute local environment verification actions and generate results from a predetermined set of local environment verifications. If these local environment verification results are returned individually by each computational machine when they are ready, machines in the linear communication orbit 204 and server 202 could be flooded with a large number of verification results communications in a short period of time. Therefore, in some embodiments, at least some of these machines hold their local environment verification results in their memory, and delay reporting the results to server 202 until server 202 proactively requests the results. This allows the local environment verification results to be reported in a managed manner without causing excessive traffic to access the linear communication orbit and the server.

Figure 7:
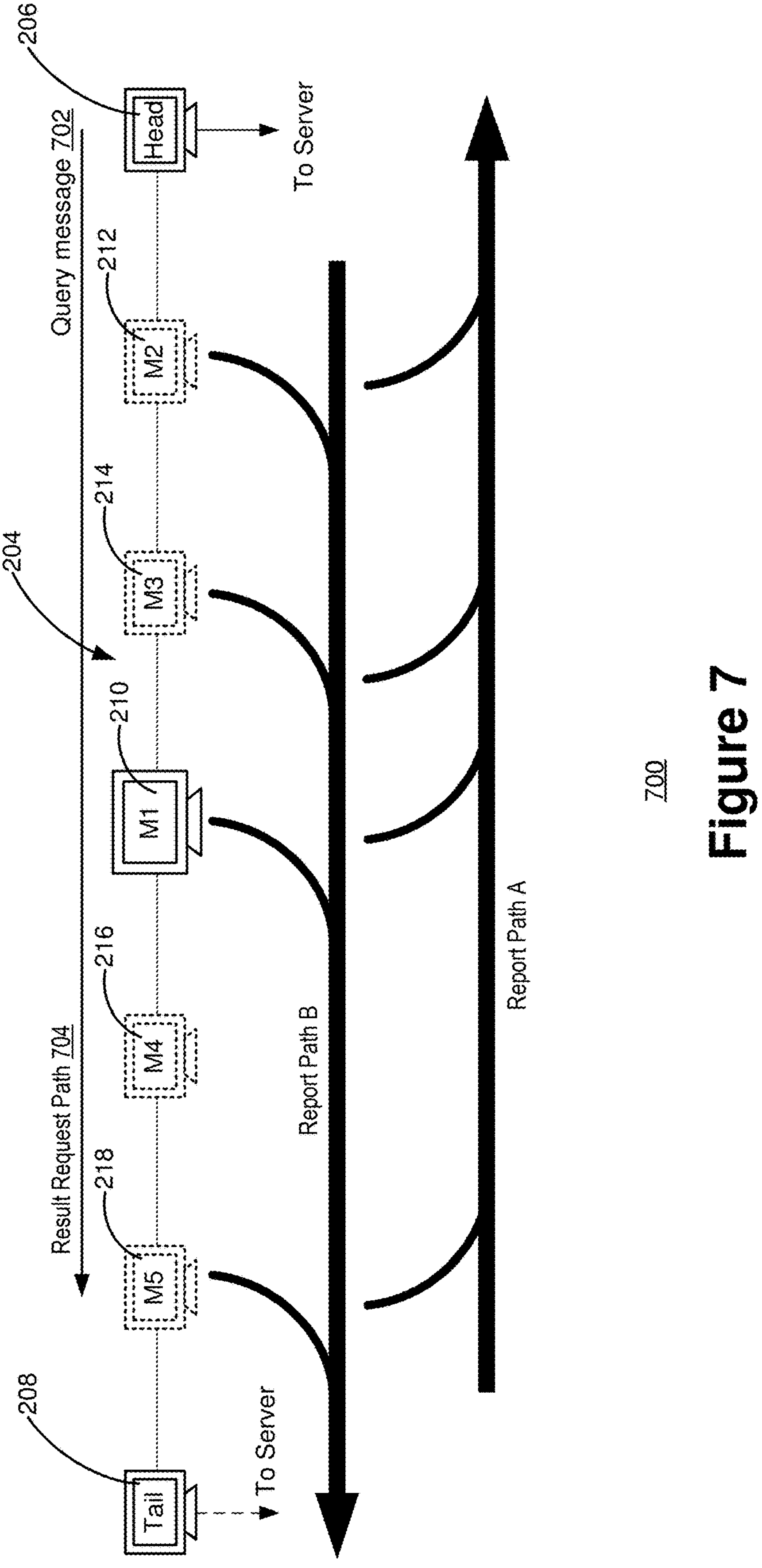
FIG. 7 illustrates an example process of returning local environment verification results in response to a query message on a linear communication orbit in accordance with some embodiments.

FIG. 7 illustrates an example process 700 of returning local environment verification results in response to a query message 702 on a linear communication orbit 204 in accordance with some embodiments. As discussed in more detail below, in some embodiments, locally generated risk scores are returned in response to the same query message that is used to collect the local results of a first set of local environment verifications, while in other embodiments, locally generated risk scores are returned in response to a query message, or one or more query messages, that request the return of locally stored risk scores and that are separate from the one or more query messages used to collect the local results of a first set of local environment verifications. Server 202 injects the query message 702 into linear communication orbit 204 to collect respective local results of the first set of local environment verifications from the first subset of nodes. In accordance with an example result request path 704, the query message is initially received at head node 206 of linear communication orbit 204, and then passed from node to node along linear communication orbit 204 until it reaches tail node 208 of linear communication orbit 204. Each node of the first subset of nodes that has deployed the local environment verification network responds to the query message by sending the respective local results of the first set of local environment verifications that have been obtained at said respective node to server 202 through linear communication orbit 204, as described in more detail below. Alternatively, if an intermediate machine (e.g., machine (M4) 216) determines that it is not one of the first subset of nodes, it passes the query message 702 from a first neighboring machine to a second neighboring machine on linear communication orbit 204.

In some embodiments, linear communication orbit 204 includes a report path A that is opposite to result request path 704. In response to receiving the query message 702 to collect its local results, each node of linear communication orbit 204 determines whether it is one of the first subset of nodes that has deployed the local environment verification network and whether the local results are available. If a specific machine (e.g., machine (M3) 214) determines that the respective node is one of the first subset of nodes and that the local results are available, it returns its local environment verification results to a neighboring machine (e.g., machine M2) from which the specific machine at the respective node received the query message. Optionally, the specific machine delays returning its local environment verification results until aggregated local environment verification results come downstream on report path A and reaches the specific machine. The local environment verification results at the respective node are incorporated into the aggregated local environment verification results, and passed downstream to the neighboring machine on report path A in an aggregated manner. When the aggregated local environment verification results reach head node 206, the computational machine at head node 206 reports the aggregated results to server 202.

Alternatively, in some embodiments, linear communication orbit 204 includes a report path B that is consistent with the result request path 704. In response to receiving from a first neighboring machine (e.g., machine M2) the query message 702 to collect its local results, a specific machine (e.g., machine M3) determines that the respective node is one of the first subset of nodes and that the local results are available. The specific machine passes its local environment verification results to a second neighboring machine (e.g., machine M1) to which the specific machine at the respective node passes the query message 702. Optionally, the specific machine delays passing its local environment verification results until aggregated local environment verification results come downstream along report path B and reach the specific machine. The local environment verification results at the respective node are incorporated into the received aggregated local environment verification results (e.g., in an aggregated results message or file, or in query message 702) and passed downstream to the neighboring machine on report path B in an aggregated manner. When the aggregated local environment verification results reach tail node 208, the computational machine at tail node 208 reports the aggregated results to server 202.

In some embodiments or in some circumstances, when the aggregated local environment verification results reach one of the first subset of nodes, the local results at the one of the first subset of nodes are not available yet. The computational machine at the one of the first subset of nodes passes the aggregated local environment verification results to a next mode in a corresponding report path. Optionally, the computational machine at the one of the first subset of nodes generates a verification status message indicating the progress of the first set of local environment verifications, and the verification status message is sent down the corresponding path in conjunction with the aggregated local environment verification results. Optionally, the computational machine at the one of the first subset of nodes holds the aggregated local environment verification results for a predetermined wait time (e.g., up to, but no longer than, the predetermined wait time), such that the computational machine at the one of the first subset of nodes could complete the first set of local environment verifications and report its local results together with the aggregated local environment verification results.

In some embodiments, the query message 702 is directed to collecting results for the first set of local environment verifications from the first subset of nodes according to predefined age criteria. Upon receiving the query message 702, each node of the first subset of nodes determines that cached results for the first set of local environment verifications meet the predefined age criteria, and sends the cached results to server 202 through linear communication orbit 204. In contrast, when a respective node of the first subset of nodes determines that the cached results for the first set of local environment verifications do not meet the predefined age criteria, it optionally aborts reporting the cached results of the first set of local environment verifications to server 202, or reports the cached results (e.g., the most recent results) to server 202 through linear communication orbit 204 regardless of whether the cached results meet the predefined age criteria. In some embodiments, query message 702 is sent repeatedly from server 202 to the nodes in a linear communication orbit according to a specified or predetermined schedule. In some embodiments, the repeated sending of query message 702 by server 202 stops once all nodes in a target set of nodes (e.g., the first subset of nodes) have reported their local verification results.

In an example, the predefined age criteria defines that the local verification results to be reported are generated within 20 minutes prior to receiving the query message. In another example, the predefined age criteria defines that the local verification results to be reported are generated within 24 hours prior to receiving the query message. One or more sets of local environment verification results are returned to server 202 as far as they are generated within 24 hours prior to receiving the query message.

In some other embodiments, the query message is directed to collecting local verification results for the first set of local environment verifications from the first subset of nodes according to a predetermined reporting schedule. The query message defines the reporting schedule as one or more of: a duration of regular reporting (e.g., a specific range of dates), a result reporting frequency (e.g., once per hour, or once every 24 hours) and one or more reporting times (e.g., 12 PM, 2 AM). Upon receiving the query message once, each node of the first subset of nodes regularly sends its recent local results to server 202 through linear communication orbit 204 according to the predetermined reporting schedule. In some embodiments, the reporting schedule defines a termination date/time for such a regular reporting scheme. In some embodiments, another reporting control message is sent to the first subset of nodes via linear communication orbit 204 to abort the regular reporting scheme.

It is noted that in some embodiments, server 202 injects a query message 702 into linear communication orbit 204 to inquire about the deployment status (e.g., as to whether a particular environment verification framework has been installed at each machine responding to the query) or verification status (e.g., as to whether all or one or more specified subsets of environment verification tests have been completed, and/or whether the generation of risks scores corresponding to all or one or more specified subsets of environment verification tests has been completed) from the first subset of nodes. The query message for deployment status or verification status is also distributed to the first subset of nodes on linear communication orbit 204 along result request path 704 (i.e., the query message is initially received at head node 206 of linear communication orbit 204, and then passed from node to node along linear communication orbit 204 until it reaches tail node 208 of linear communication orbit 204). Each node of the first subset of nodes responds to the query message by sending corresponding status information that has been obtained at said respective node to server 202 through linear communication orbit 204. Optionally, one or more nodes of the first subset of nodes receive aggregated status information that comes downstream along report path A or B, and incorporates its own status information into the aggregated status information before passing it further downstream on report path A or B. Alternatively, if an intermediate machine (e.g., machine M4) determines that the respective node is not one of the first subset of nodes, it passes the corresponding status information (aggregated or individual) it receives from a first neighboring machine to a second neighboring machine on linear communication orbit 204.

In some embodiments, server 202 receives deployment status data from the first subset of nodes through linear communication orbit 204. The deployment status data includes respective messages from one or more nodes in the first subset of nodes indicating status of establishment of the respective local environment verification framework at said one or more nodes. In accordance with the received deployment status data, server 202 provides deployment progress updates to a user. Under some circumstances, the deployment status data are reported from the first subset of nodes at a substantially high refresh rate (e.g., controlled by a predefined age criteria of the local verification results), such that the deployment progress updates are provided substantially in real time to the user. Similarly, in some embodiments, server 202 receives verification status data from the first subset of nodes through linear communication orbit 204. The verification status data includes respective messages from one or more nodes in the first subset of nodes indicating status of the first set of local environment verifications at said one or more nodes. In accordance with the received verification status data, server 202 provides action progress updates to a user. Under some circumstances, the verification status data are reported from the first subset of nodes at a substantially high rate (e.g., every one minute), such that the action progress updates are provided in real time to the user.

Figure 8A:
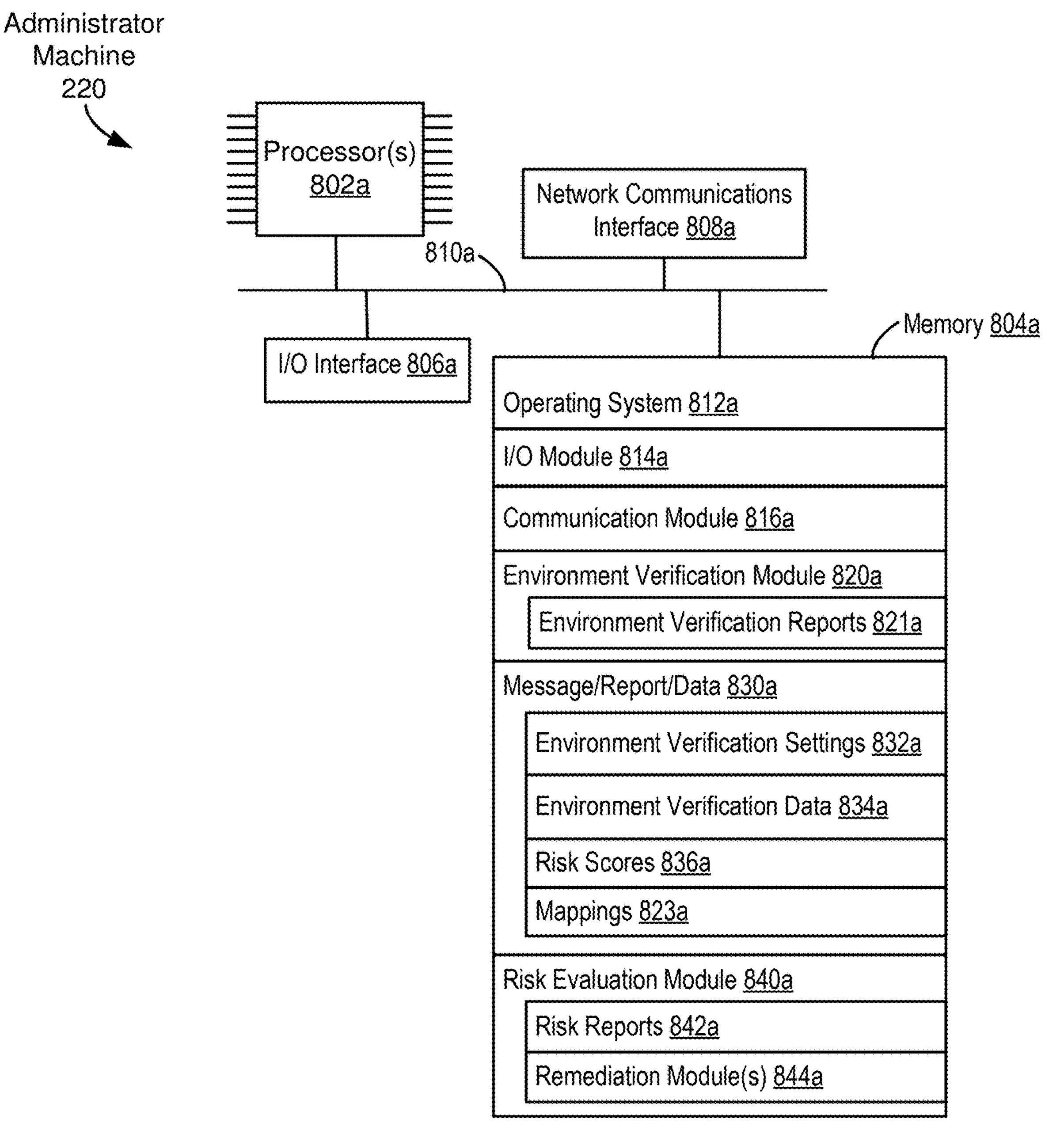
FIG. 8A is a block diagram of an example administrator machine in one of the example linear communication orbits shown in FIGS. 1-7 in accordance with some embodiments.

FIG. 8A is a block diagram of an example of an administrator machine 220 that is coupled to one or more of the linear communication orbits shown in FIGS. 1-7, in accordance with some embodiments. In some embodiments, administrator machine 220 includes one or more processors 802*a*, memory 804*a* for storing programs and instructions for execution by one or more processors 802*a*, one or more communications interfaces (such as input/output interface 806*a* and network interface 808*a*), and one or more communications buses 810*a* for interconnecting these components.

In some embodiments, input/output interface 806*a* includes a display and input devices such as a keyboard, a mouse or a track-pad. In some embodiments, communication buses 810*a* include circuitry (sometimes called a chipset) that interconnects and controls communications between system components. In some embodiments, memory 804*a* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804*a* includes one or more storage devices remotely located from the one or more processors 802*a*. In some embodiments, memory 804*a*, or alternatively the non-volatile memory device(s) within memory 804*a*, includes a non-transitory computer readable storage medium.

In some embodiments, memory 804*a* or alternatively the non-transitory computer readable storage medium of memory 804*a* stores the following programs, modules and data structures, instructions, or a subset thereof:

- Operating System 812*a* that includes procedures for handling various basic system services and for performing hardware dependent tasks;
- I/O module 814*a* that includes procedures for handling various basic input and output functions through one or more input and output devices;
- Communication module 816*a* that is used for connecting administrator machine 220 to a server system (e.g., server 202) and/or computational machines 206-218 via one or more network communication interfaces 808*a* (wired or wireless) and one or more communication networks, such as the Internet, other wide area networks, local area networks, metropolitan area networks, and so on;
- Environment verification module 820*a* that includes instructions for handling receipt, processing, propagation, collecting and reporting of system, security and network management messages/commands configured to verify local environments of computational machines located at nodes in a network of interconnected machines (e.g., instructions for providing a user interface to receive user inputs of one or more parameters that specify a set of local environment verifications to be performed at a first subset of nodes of a linear communication orbit; and/or instructions for presenting, via the user interface, local environment verification results collected from a linear communication orbit); in some embodiments, environment verification module 820*a* includes one or more programs or instructions for generating one or more environment verification reports 821*a* (e.g., for display in a user interface of the environment verification module 820*a*) for one or more computational machines;

Messages, reports and/or other data 830*a* that is stored, temporarily or otherwise, upon receipt from server 202, and/or that is locally generated, revised or supplemented by administrator machine 220 prior to transmission to server 202. In some embodiments, messages, reports and/or other data 830*a* further include one or more of:
- environment verification settings 832*a* of a local environment verification framework (e.g., compliance benchmarks, benchmark engines, computer groups and operation parameters), which are provided by the administrator machine 220 (or server 202) to computational machines to which the local environment verification framework is distributed;
- environment verification data 834*a*, collected from the computational machines located at a first subset of nodes of one or more linear communication orbits 204, regarding deployment or execution of the local environment verification framework (e.g., local verification results, deployment status data and verification status data) by the computational machines located at nodes on those linear communication orbits 204,
- risk scores 836*a* received from (e.g., collected from) the computational machines located at a first subset of nodes of one or more linear communication orbits 204, and
- a set of mappings 823*a*, which are provided to computational machines for the purpose of mapping environmental verification test results into risk scores, as described in more detail below; and Risk evaluation module 840*a*, which evaluates the risk scores (sometimes called risk evaluation values), received from (e.g., collected from) the computational machines located at a first subset of nodes of one or more linear communication orbits 204, and produces a variety of risk reports 842*a*, discussed in more detail below, for assisting a system administrator in determining which computational machines and/or categories of environment verification failures represent the most urgent or critical risks; in some embodiments, risk evaluation module includes, or is coupled to one or more remediation modules 844*a*, for initiating remedial actions (sometimes called remediation tasks) at respective computational machines, so as to bring those computational machines into compliance, or better compliance, with a set of security configuration standards or benchmarks.

The following discussion regarding the set of mappings 823*a* is equally applicable to the set of mappings 823*b* (of server 202, FIG. 8B) and the set of mappings 823*c* (or computational machine 102, FIG. 8C), all of which are typically the same set of mappings. Similarly, the following discussion regarding the risk assessment reports that can be generated by risk evaluation module 840*a* are equally applicable to risk evaluation module 840*b* of server 202. It is noted that, in some embodiments, risk scores for individual computational machines are locally generated at each of the individual computational machines by the risk scoring module 825 of that computational machine, using the locally stored set of mappings 823*c*. Even though generation of risk scores from test results for any one computational machine is not computationally complex, local generation of risk scores at the computational machines has the advantage of distributing those computations over a large number of machines, thereby avoiding computational bottlenecks that might result if risk scores for thousands of computational machines were computed at a server system, or even a small number of server systems. On the other hand, combined risk scores, for groups of computational machines (as discussed below), and/or combined risk scores for user-defined combinations of control categories, are typically generated at a server system (e.g., server 202 or administrator machine 220).

In some embodiments, the set of mappings 823*a* include predefined scores for each test result (e.g., for each failed test, based on the security risk associated with the failed test), which are then combined to produce risk scores for one or more of: (A) individual computational machines, (B) one or more groups of computational machines, where the groups may be either predetermined or selected by a user (e.g., a system administrator using administrator machine 220), and (C) control categories, each of which corresponds to a group of the test results. For example, the mappings 823*a* may apply a first score (e.g., 5) to a first subset of the tests, the failure of which is considered to represent a high level of security risk, a second score (e.g., 3) to a second subset of the tests, the failure of which is considered to represent a middle level of security risk, and a third score (e.g., 1) to a third subset of the tests, the failure of which is considered to represent a low level of security risk. More generally, the mappings 823*a* typically include, for each distinct test, a corresponding score that is to be used when that test is failed by a computational machine. Tests that are passed are typically assigned a risk score of zero, as those tests do not indicate a security or system risk. In some cases, the risk score assigned to a particular test may be conditional, based on the outcome of one or more other tests. For example, for tests A123 and A124 (which are arbitrary text names used for this example), if failing both tests A123 and A124 represents a much greater security risk than failing either one alone, then tests A123 and A124 may be assigned, by mappings 823*a*, a default risk score (e.g., 5) if that test is failed, and one of those tests, e.g., test A123 may be assigned a conditional risk score (e.g., 25) if both tests are failed (by the same computational machine). The conditional risk score for a respective test is typically larger than twice the default risk score for the respective test.

In some embodiments, the set of mappings 823*a* include risk score mappings for a plurality (typically many, e.g., dozens) of control categories. Each control category corresponds to a plurality (e.g., typically 2 to 10, or 2 to 20) of individual tests. For each control category, the risk scores for the corresponding test results (e.g., for a computational machine) are combined (e.g., summed together) to produce a risk score for the control category. In some embodiments, a normalization or scaling factor (which is included in the set of mappings 823*a*) is applied when combining the risk scores of the corresponding tests, to produce the risk score for the control category. The use of a normalization or scaling factor for each control category enables meaningful comparison, or ranking, of the risk scores for different control categories. For example, with the application of such normalization or scaling factors to the different control categories, a higher risk score for a first control category than a second control category indicates a high level of security risk for the system or security vulnerabilities represented by the first control category than the second control category. As a result, control categories can be ordered (e.g., in a report or user interface) based on their risk scores.

Figure 8B:
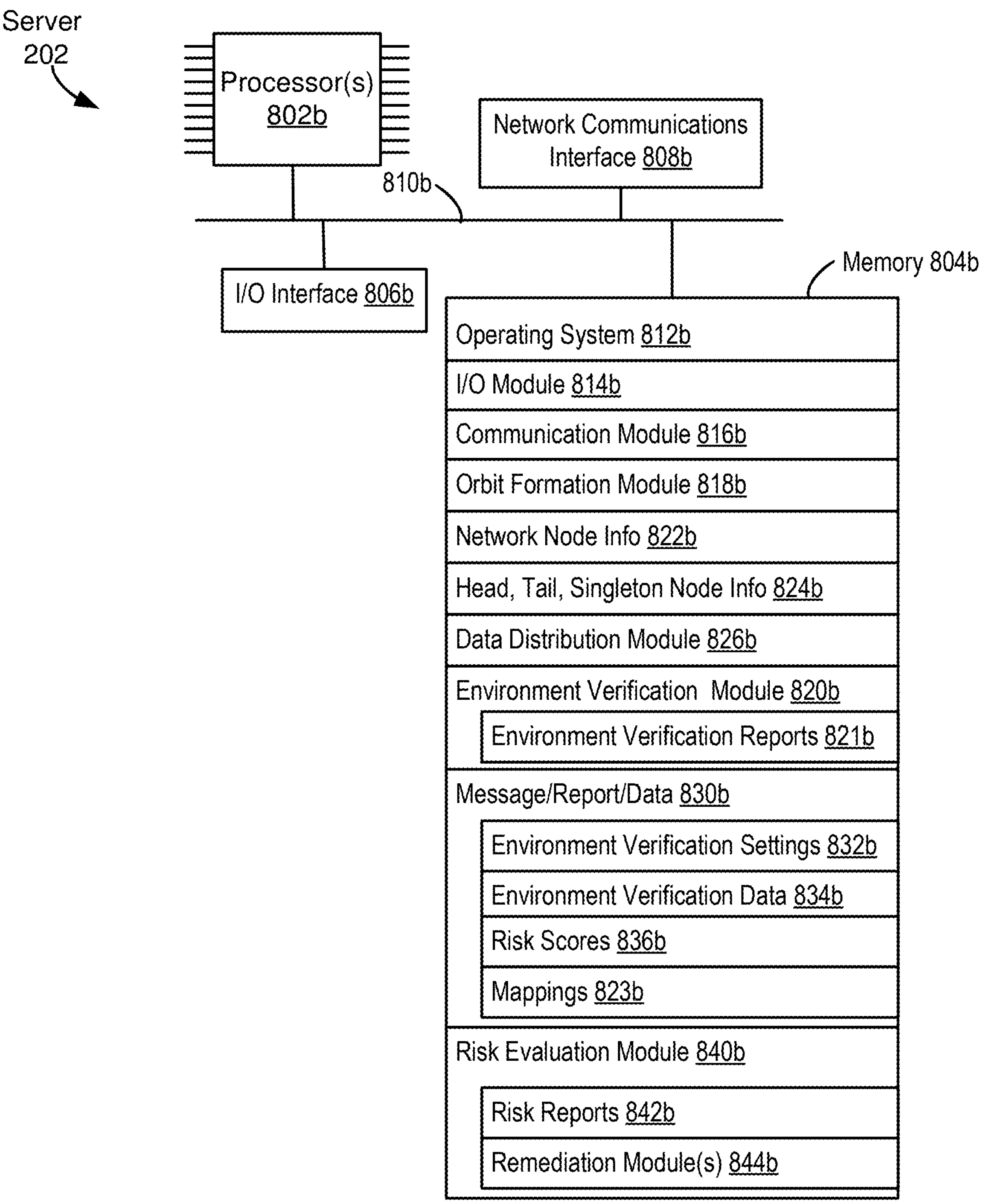
FIG. 8B is a block diagram of an example server in one of the example linear communication orbits shown in FIGS. 1-7 in accordance with some embodiments.

In some embodiments, control category risk reports are produced by risk evaluation module 840*a* (or risk evaluation module 840*b*, FIG. 8B). In some embodiments, one of the control category risk reports generated by risk evaluation module 840*a* is a control category risk report for an individual computational machine, showing which control categories have the highest risk scores for that computational machine. In some embodiments, the control category risk report identifies control categories satisfying predefined criteria (e.g., control categories having a risk score at or above a predefined level, or control categories having the "top N" worst (e.g., highest) risk scores, where N is an integer (e.g., an integer between 1 and 20, or 1 and 100), or a "filtered top N" criterion, listing up to N control categories that have risk scores above a predefined level, etc.). This report helps to focus the system administrator's attention on the control categories most in need of attention.

In some embodiments, another one of the control category risk reports generated by risk evaluation module 840*a* is a control category risk report for a group of computational machines, showing which control categories have the highest risk scores for that group of computational machines. The group of computational machines can be either predefined, or selected by the user at the time the report is generated, by specifying a number of parameters (e.g., selecting machines by characteristics such as operating system, machine type, physical location, installed applications, update status, etc.). This report helps to focus the system administrator's attention on the control categories for the group of machines most in need of attention. In some embodiments, the control category risk report for a group of computational machines identifies control categories satisfying predefined criteria, for example the predefined criteria discussed above, or similar or other predefined criteria.

In some embodiments, yet another one of the control category risk reports generated by risk evaluation module 840*a* is a control category risk report for a group of computational machines, showing which computational machines have the highest risk scores for a respective control category. For example, the computational machines can be ordered in the report based on (A) the risk score for that control category for each of the computational machines in the group, or (B) a combined risk score (e.g., for all control categories, or a selected plurality of control categories for each of the computational machines in the group. In the latter case, the plurality of control categories can be predefined (e.g., a predefined group of control categories of which the respective control category is a member), or a user-selected group of control categories. As noted above, the group of computational machines can be either predefined, or selected by the user at the time the report is generated, by specifying a number of parameters (e.g., selecting machines by characteristics such as operating system, machine type, physical location, installed applications, update status, etc.). In some embodiments, the control category risk report for a group of computational machines identifies computational machines satisfying predefined criteria, for example computational machines whose risk scores are at or above a predefined level, or computational machines having the "top M" worst risk scores, where M is an integer (e.g., an integer between 1 and 20, or 1 and 100), or a "filtered top M" criterion, listing up to M computational machines that have risk scores above a predefined level, etc.). This report helps to focus the system administrator's attention on computational machines most in need of attention with respect to risk factors associated with the respective control category. In some embodiments, numerous other types of risk assessment reports can be generated by the risk evaluation module 840*a*.

The risk scores for the control categories optionally include mappings for two or more levels of control categories, including a plurality of low level control categories, each corresponding to a plurality of the test results from one or more benchmarks, optionally including a plurality of mid-level control categories, each of which includes two or more of the low level control categories, and a plurality of high-level control categories, each of which includes two or more of the mid-level control categories, if mid-level control categories are provided, and otherwise two or more of the low level control categories. For each control category above the lowest level, the risk scores for the corresponding lower-level control categories (e.g., for a computational machine) are combined (e.g., summed together) to produce a risk score for the control category. In some embodiments, a normalization or scaling factor (which is included in the set of mappings 823*a*) is applied when combining the risk scores of the corresponding lower-level control categories, to produce the risk score for the higher-level control category. The use of a normalization or scaling factor for each higher-level control category enables meaningful comparison, or ranking, of the risk scores for different control categories at the same level. For example, with the application of such normalization or scaling factors to the different higher-level control categories, a higher risk score for a first higher-level control category than a second higher-level control category indicates a high level of security risk for the system or security vulnerabilities represented by the first higher-level control category than the second higher-level control category. As a result, higher-level control categories can be ordered (e.g., in a report or user interface) based on their risk scores. In such embodiments, risk evaluation module 840*a* generates risk assessment reports for both lower-level control categories and higher-level control categories.

Optionally, administrator machine 220 is a machine coupled to server 202, but does not belong to a linear communication orbit 204 on which the local environment verification framework is deployed. Optionally, administrator machine 220 is integrated within server 202. More details on server 202 are provided below with respect to FIG. 8B.

Optionally, administrator machine 220 is a computational machine coupled on a linear communication orbit 204 and configured to function as an administrator to control deployment of the local environment verification framework and collect local environment verification results and risk scores from computational machines located at nodes on a respective linear communication orbit 204. In these circumstances, administrator machine 220 includes one or more of modules shown in FIG. 8C for performing the functions of a computational machine in a linear communication orbit, including: an orbit formation module 818*c* for implementing a predetermined set of rules for creating, maintaining, and repairing the linear communication orbit for deploying the local environment verification framework; neighboring node information 822*c* identifying neighboring nodes of machine 220; a data distribution module 826*c* for handling receipt, processing, propagation, collecting and reporting in response to system management messages for distributing objects to be installed or updated on machine 220 (e.g., a command to deploy the local environment verification framework); a data request module 827c for processing data requests received from a predecessor node, successor node or server, and a data caching module 828c for receiving, caching, and propagating specific data that pass machine 220. More details on embodiments of administrator machine 220 coupled on (or included in) a linear communication orbit 204 are provided below with reference to FIG. 8C.

FIG. 8B is a block diagram of a server system 202, herein called server 202 for ease of reference, an example of which is server 108, which is coupled to one or more linear communication orbits, as shown in FIGS. 1-7, in accordance with some embodiments. In some embodiments, server 202 includes one or more processors 802b, memory 804b for storing programs and instructions for execution by the one or more processors 802b, one or more communications interfaces such as input/output interface 806b and network interface 808b, and one or more communications buses 810b for interconnecting these components.

In some embodiments, server 202 does not include an input/output interface 806b. In some embodiments in which server 202 does include an input/output interface 806b, input/output interface 806b includes a display and input devices such as a keyboard, a mouse or a track-pad. In some embodiments, communication buses 810b include circuitry (sometimes called a chipset) that interconnects and controls communications between system components. In some embodiments, memory 804b includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804b includes one or more storage devices remotely located from the one or more processors 802b. In some embodiments, memory 804b, or alternatively the non-volatile memory device(s) within memory 804b, includes a non-transitory computer readable storage medium.

In some embodiments, memory 804b or alternatively the non-transitory computer readable storage medium of memory 804b stores the following programs, modules and data structures, instructions, or a subset thereof:

- Operating System 812b that includes procedures for handling various basic system services and for performing hardware dependent tasks.
- I/O module 814b that includes procedures for handling various basic input and output functions through one or more input and output devices.
- Communication module 816b that is used for connecting server 202 to one or more computational machines (e.g., machines 206-218 on linear communication orbit 204, as shown in FIG. 2) coupled to network 100 (FIG. 1) via one or more network communication interfaces 808b (wired or wireless) and one or more communication networks, such as the Internet, other wide area networks, local area networks, metropolitan area networks, and so on.
- Orbit formation module 818b that includes instructions to implement a predetermined set of rules for creating, maintaining, and repairing one or more linear communication orbits for network and system management (e.g., to determine which machines 102, of all machines 102 currently known to be coupled to network 100, are coupled to the same local area network, and to communicate information to those machines to enable them to self-organize into a linear communication orbit), where in some embodiments, orbit formation module 818b also stores a list of singletons, and head nodes and/or tail nodes of the linear communication orbits in the network;
- Environment verification module 820b that includes instructions for handling receipt, processing, propagation, collecting and reporting of system, security and network management messages/commands configured to verify local environments of computational machines located at nodes in a network of connected machines (e.g., query messages related to deployment, execution, status checking and result collection of local environment verifications for nodes in one or more local communicator orbits 204); in some embodiments, such as embodiments in which server 202 is configured to be used as an administrator machine, environment verification module 820b includes one or more programs or instructions for generating one or more environment verification reports 821b (e.g., for display in a user interface of the environment verification module 820b) for one or more computational machines;
- Network node information 822b that includes information identifying all nodes known to be coupled to network 100, where in some embodiments, server 202 maintains a record of nodes currently known to be coupled to the managed network and their respective unique identifiers (e.g., IP addresses and optionally other unique identifiers), and optionally, server 202 also maintains the ordinal positions of these machines in a sorted sequence according to their respective unique identifiers;
- Head, tail and singleton node information 824b for identifying head nodes, tail nodes and singleton nodes with established communication channels to and/or from server 202, where in some embodiments, server 202 maintains a list of head nodes, tail nodes, and singleton nodes that have opened forward and backward connections with server 202;
- Messages, reports and/or other data 830b that is stored, temporarily or otherwise, upon receipt from computational machine 102 or administrative machine 220, and/or that is locally generated, revised or supplemented by server 202 prior to transmission to computational machine 102 or administrative machine 220, where in some embodiments, messages, reports and/or other data 830b further include one or more of:
  - environment verification settings 832b of the local environment verification framework (e.g., compliance benchmarks, benchmark engines, computer groups and operation parameters), which are provided by the administrator machine 220 (or server 202) to computational machines to which the local environment verification framework is distributed,
  - environment verification data 834b collected from computational machines located at the first subset of nodes of linear communication orbit 204 regarding deployment or execution of the local environment verification framework (e.g., local verification results, deployment status data and verification status data) by the computational machines located at the first subset of nodes on linear communication orbit 204,
  - risk scores 836b received from (e.g., collected from) the computational machines located at a first subset of nodes of one or more linear communication orbits 204,
  - a set of mappings 823b, which are provided to computational machines for the purpose of mapping environmental verification test results into risk scores, as described in more detail below with reference to FIG. 10;

Data distribution module 826*b* that includes instructions for providing a particular system management message and collecting status messages for distribution and caching of an object (e.g., query messages related to deployment, execution, status checking and result collection of local environment verifications). In some embodiments, the data distribution module 826*b* is included in the environment verification module 820*b*. Specifically, the data distribution module 826*b* generates a system management message that includes one or more data distribution commands and/or manifests for distributing to at least one computational machine on a linear communication orbit a bundle of information items regarding deployment of a local environment verification framework. Optionally, the linear communication orbit returns at least one caching status message to server 202, and the data distribution module 826*b* tracks locations on the linear communication orbit of locally cached copies of each shard included in the bundle of information items; and Risk evaluation module 840*b*, which evaluates the risk scores (sometimes called risk evaluation values, received from (e.g., collected from) the computational machines located at a first subset of nodes of one or more linear communication orbits 204, and produces a variety of risk reports 842*b*, discussed in more above with reference to FIG. 8A and risk evaluation module 840*a*, for assisting a system administrator in determining which computational machines and/or categories of environment verification failures represent the most urgent or critical risks; in some embodiments, risk evaluation module includes, or is coupled to one or more remediation modules 844*b*, for initiating remediation tasks at respective computational machines, so as to bring those computational machines into compliance, or better compliance, with a set of security configuration standards or benchmarks.

In some embodiments, environment verification module 820*b* of server 202 provides a user interface for an administrator to dispatch the bundle of information items regarding deployment of the local environment verification framework to a selected group of machines, i.e., to receive user inputs of one or more parameters for performing a set of local environment verifications at a first subset of nodes of the linear communication orbit. Environment verification module 820*b* of server 202 may also enable presenting on the user interface local environment verification results, deployment status information and verification status information collected from linear communication orbit 204.

Figure 8C:
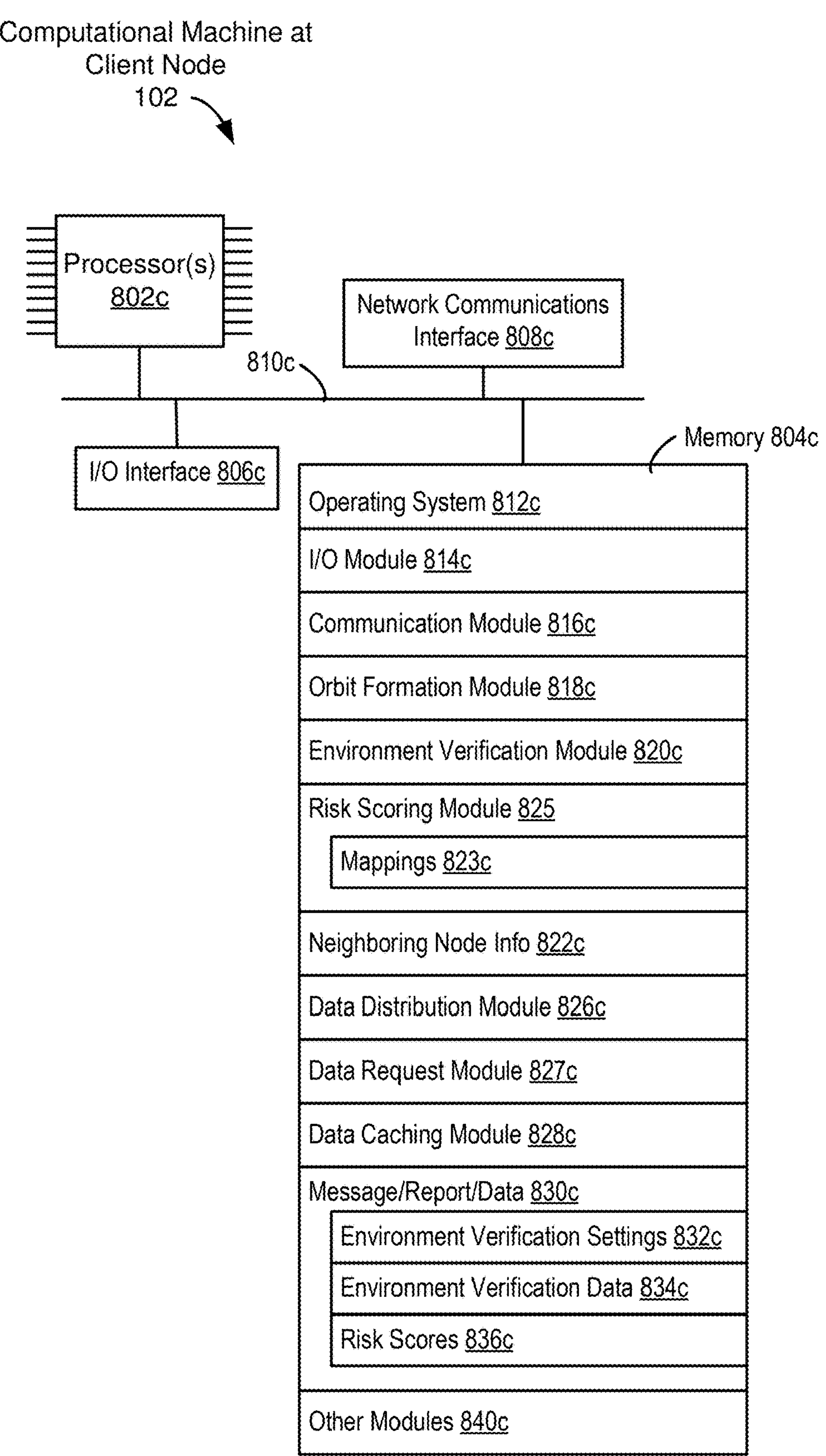
FIG. 8C is a block diagram of an example computational machine in the example linear communication orbits shown in FIGS. 1-7 in accordance with some embodiments.
Figure 11A:
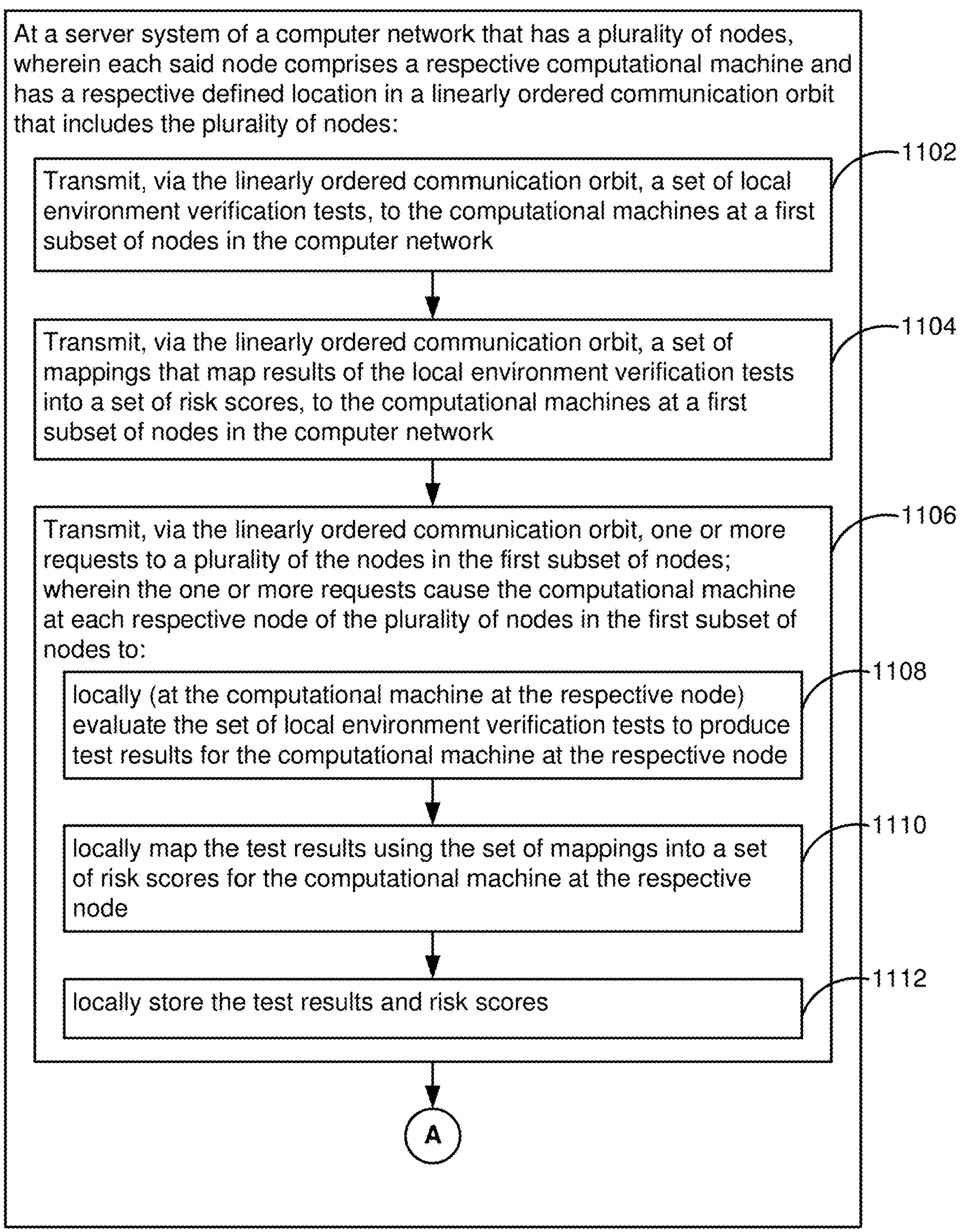
Figure 11B:
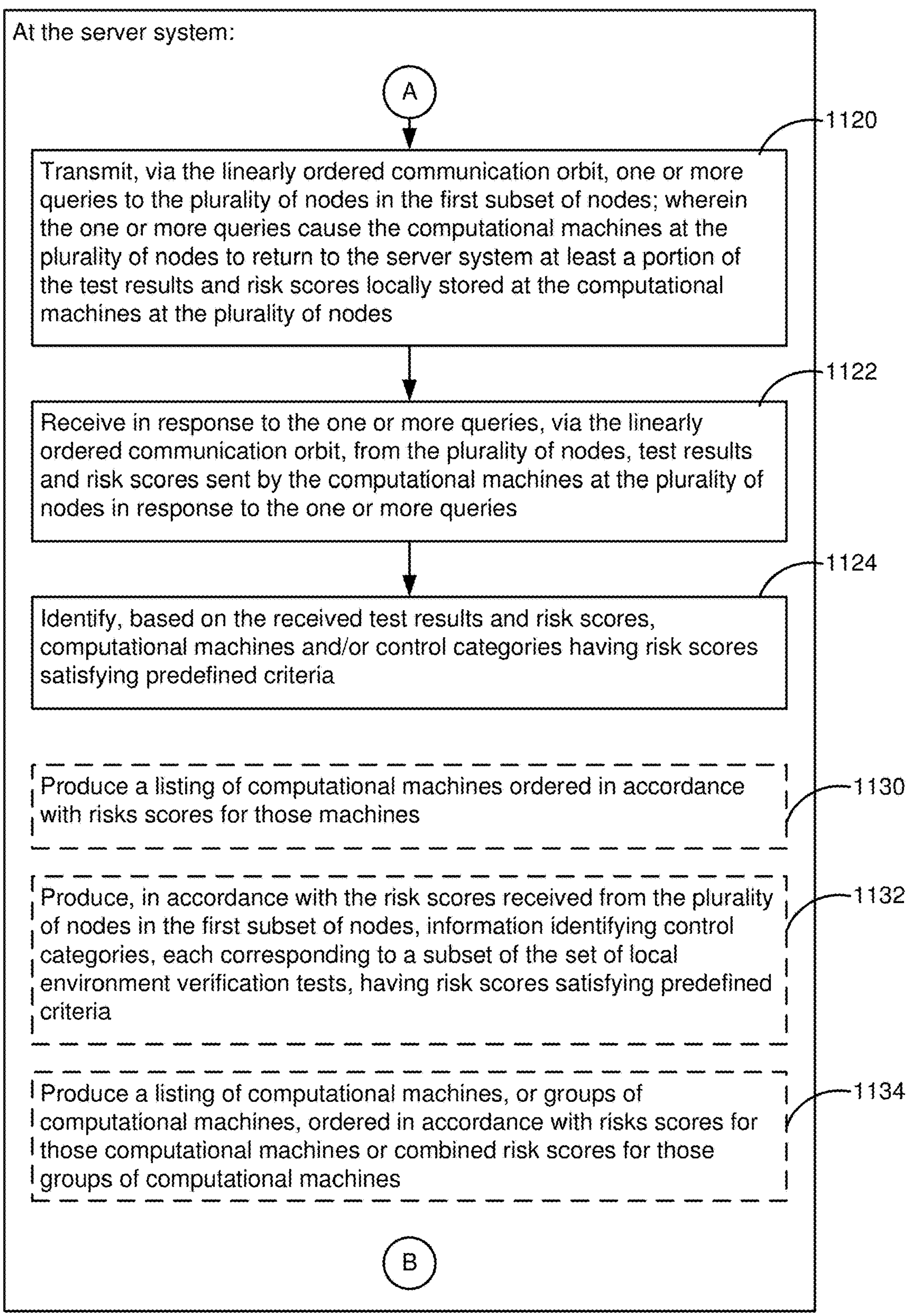
Figure 11C:
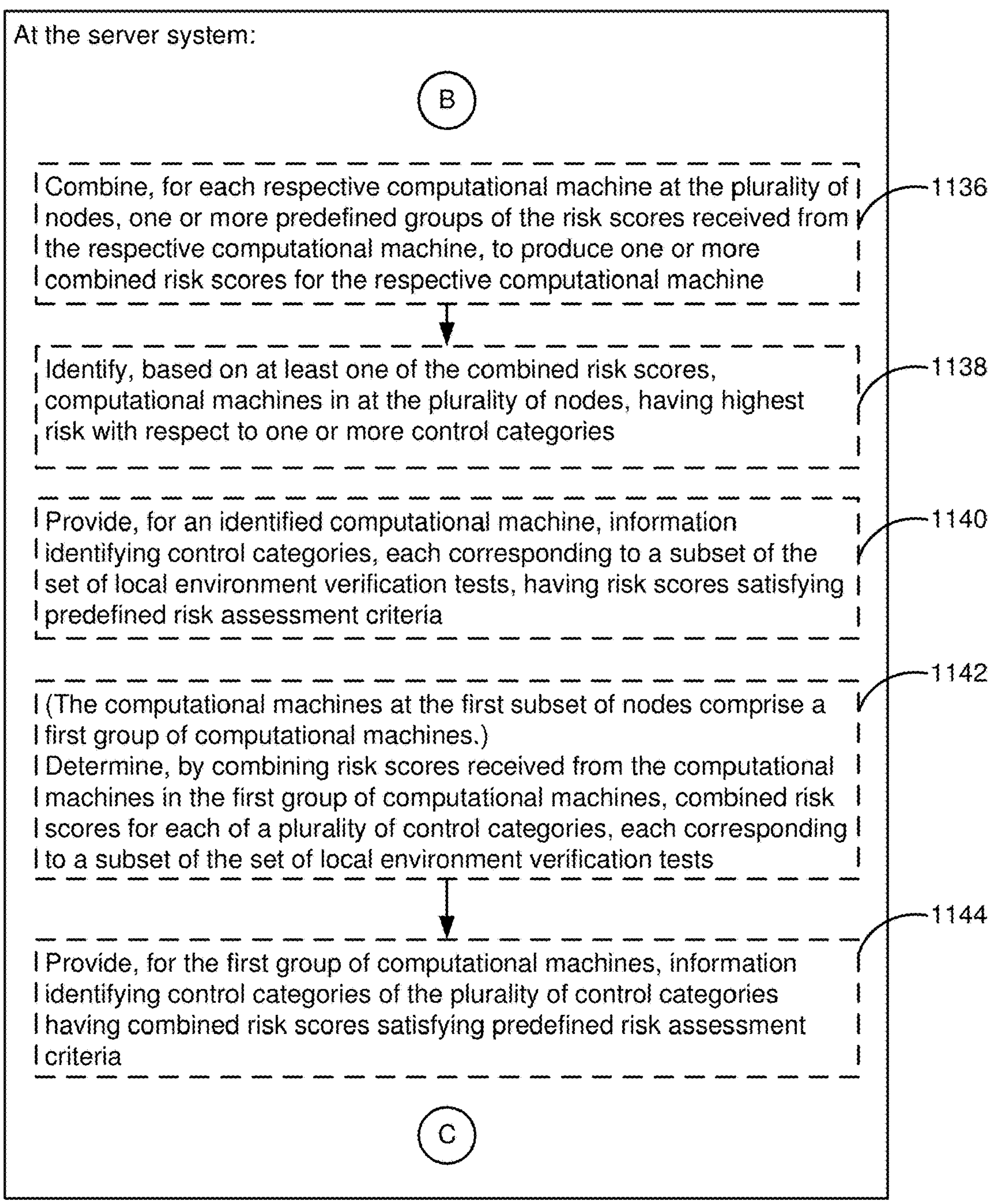

FIG. 8C is a block diagram of a respective computational machine 102 (e.g., any of computational machines 206-218, FIG. 2) located at a node (sometimes called a client node or endpoint or endpoint node) in any of the linear communication orbits shown in FIGS. 1-7, in accordance with some embodiments. In some embodiments, computational machine 102 includes one or more processors 802*c*, memory 804*c* for storing programs and instructions for execution by one or more processors 802*c*, one or more communications interfaces such as input/output interface 806*c* and network interface 808*c*, and one or more communications buses 810*c* for interconnecting these components.

In some embodiments, input/output interface 806*c* includes a display and input devices such as a keyboard, a mouse or a track-pad. In some embodiments, communication buses 810*c* include circuitry (sometimes called a chipset) that interconnects and controls communications between system components. In some embodiments, memory 804*c* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804*c* includes one or more storage devices remotely located from the one or more processors 802*c*. In some embodiments, memory 804*c*, or alternatively the non-volatile memory device(s) within memory 804*c*, includes a non-transitory computer readable storage medium.

In some embodiments, memory 804*c* or alternatively the non-transitory computer readable storage medium of memory 804*c* stores the following programs, modules and data structures, instructions, or a subset thereof:

Operating System 812*c* that includes procedures for handling various basic system services and for performing hardware dependent tasks;

I/O module 814*c* that includes procedures for handling various basic input and output functions through one or more input and output devices;

Communication module 816*c* that is used for connecting machine 102 to other machines (e.g., other machines 102 in network 100, FIG. 1) or servers (e.g., server 202) via one or more network communication interfaces 808*c* (wired or wireless) and one or more communication networks, such as the Internet, other wide area networks, local area networks, metropolitan area networks, and so on;

Orbit formation module 818*c* that includes instructions implementing a predetermined set of rules for creating, maintaining, and repairing the linear communication orbit for network and system management;

Environment verification module 820*c* that includes instructions for handling receipt, processing, propagation, collecting and reporting of system, security and network management messages/commands configured to verify the local environment of machine 102 (e.g., query messages related to deployment, execution, status checking and result collection of local environment verifications);

Risk scoring module 825 that includes instructions for mapping local environment verification test results produced by environment verification module 820*c* into risk scores, in accordance with a set of mappings 823*c* (e.g., received from a server system such as server 202), used to map verification test results into risk scores, as discussed in more detail above, with reference to risk evaluation module 840*a*, FIG. 8A;

Neighboring node information 822*c* that includes information identifying neighboring nodes of the computational machine 102 on the linear communication orbit 204;

Messages, reports and/or other data 830*c* that is stored, temporarily or otherwise, upon receipt from another computational machine 102 or server 202, and/or that is locally generated, revised or supplemented by machine 102 prior to transmission to another computational machine 102 or server 202, where in some embodiments, messages, reports and/or other data 830*c* further include one or more of:

environment verification settings 832*c* of the local environment verification framework (e.g., compliance benchmarks, benchmark engines, computer groups and operation parameters), which are provided by an administrator machine (e.g., administrator machine 220, or server 202) to computational machine 102, environment verification data 834*c*, produced locally by execution of the environment verification tests or benchmarks, by the environment verification module 820*c*; environment verification data 834*c* includes data regarding deployment or execution of the local environment verification framework (e.g., local verification results, deployment status data and verification status data), and risk scores 836*c* produced by risk scoring module 825, by applying mappings 823*c* to local environment verification results produced by environment verification data 834*c*, as described in more detail below with reference to FIG. 10;

Data distribution module 826*c* that includes instructions for handling receipt, processing, propagation, collecting and reporting in response to system management messages for distributing objects to be installed or updated on machine 102 (e.g., query messages related to deployment, execution, status checking and result collection of local environment verifications); in some embodiments, the data distribution module 826*c* is included in the environment verification module 820*c*, and in some embodiments, the data distribution module 826*c* generates a plurality of data requests for collecting the bundle of information items regarding deployment of the local environment verification framework (and, optionally, mappings 823*c*), identifies or receives a respective specific file shard in response to each data request, and generates or reconstitutes the bundle of information items from the identified or received specific data;

Data request module 827*c* that includes instructions for processing data requests received from a predecessor node, successor node or server; and Data caching module 828*c* that includes instructions for receiving, caching, and propagating specific data received by this specific machine 102 (e.g., data received by this specific machine due to a data request by another machine in the same linear communication orbit 204 as this specific machine 102, as described above with reference to FIGS. 4-6) and optionally for reporting related caching activities at machine 102; and optionally, other modules 840*c* and/or sets of data, locally stored at the computational machine 102.

FIGS. 8A-8C are merely illustrative of the structures of machine 220, server 202 and machine 102. A person skilled in the art would recognize that particular embodiments of machine 220, server 850 and machine 102 may include more or fewer components than those shown. One or more modules may be divided into sub-modules, and/or one or more functions may be provided by different modules than those shown. In some embodiments, server 202 implements or performs one or more methods, including the methods described below with respect to FIGS. 11A-11D.

FIG. 9 schematically depicts examples of user interface components that together form a user interface (UI) 900 of an environment verification module (e.g., environment verification module 820*a* of administrator machine 220, or environment verification module 820*b* of server 202). In some embodiments, user interface 900 includes user interface component 902 for enabling a user to specify verification data selection criteria, thereby specifying one or more of the following: a computational machine, or group of computational machines, on which a set of local environment verification tests should be executed; a range of dates and/or times during which the set of local environment verification tests should be executed; one or more subsets of a predefined set of local environment verification tests that should be executed at the specified computational machines. In some embodiments, other parameters for controlling what local environment verification tests are executed by the computational machines may be specified. In some embodiments, the resulting environment verification settings are distributed to the specified computational machines.

In some embodiments, user interface 900 includes user interface component 904 for selecting the verification reports 906 to be generated and presented by the machine (e.g., an administrator machine 220 or server system 202) executing the environment verification module. For example, local environment verification tests can be presented in numerous different ways, for example through the use of bar graphs, pie charts, listings, and so on, indicating which local environment verification tests were passed and which were failed by computational machines in the set of computational machines for which local environment verification tests are being views. As a result, the user is provided a number of ways to view and analyze the local environment verification tests.

In some embodiments, while using user interface 900, for example while viewing a respective local environment verification report 906, the user can select and invoke a remedial action so as to address one or more of the local environment verification tests that were not passed by one or more of the computational machines. In some embodiments, user interface component 908 presents to the user one or more remedial actions determined (e.g., automatically determined by administrator machine 220 or server system 202) to be potentially useful for addressing local environment verification test failures represented in respective local environment verification report. In some embodiments, the one or more remedial actions include installing one or more software patches at identified computational machines (e.g., computational machines that failed one or more local environment verification tests, or that have a risk score or category risk score satisfying predefined criteria) to overcome security vulnerabilities detected via the first set of local environment verifications. In some embodiments, the one or more remedial actions include sending a warning message to be communicated to the users of identified computational machines to perform one or more remedial actions (e.g., change computational machine's settings or configuration to require authentication on computational machine power on, resume or wake).

In some embodiments, while using user interface 900, for example while viewing a respective local environment verification report 906, the user can invoke the risk evaluation module 840*a* or 840*b*, so as to view local environment verification results in one or more risk-prioritized presentations, as discussed below with reference to FIG. 10.

FIG. 10 schematically depicts examples of user interface components that together form a user interface (UI) 1000 of a risk evaluation module (e.g., risk evaluation module 840*a* of administrator machine 220, or risk evaluation module 840*b* of server 202). In some embodiments, user interface 1000 includes user interface component 902 for enabling a user to specify data selection criteria 1002, thereby specifying one or more of the following: a computational machine, or group of computational machines, for which risk evaluation results (e.g., risk scores) should be presented;

a range of dates and/or times for which risk evaluation results should be presented; one or more control categories (e.g., where each control category corresponds to a subset of a predefined set of local environment verification tests) for which risk evaluation results should be presented. It is noted that the aforementioned range of dates and/or times correspond to a range of dates and/or times associated with local environment verification tests for which risk evaluation results have been generated.

In some embodiments, user interface 1000 includes user interface component 1004 for selecting the risk evaluation reports 1006 to be generated and presented by the machine (e.g., an administrator machine 220 or server system 202) executing the risk evaluation module. Examples of risk evaluation reports are discussed above, with reference to risk evaluation module 840*a*, FIG. 8A.

In some embodiments, while using user interface 1000, for example while viewing a respective risk evaluation report 1006, the user can select and invoke a remedial action so as to address one or more of the local environment verification tests that were not passed by one or more of the computational machines. In some embodiments, user interface component 1008 presents to the user one or more remedial actions determined (e.g., automatically determined by risk evaluation module 840*a* of administrator machine 220 or risk evaluation module 840*b* of server system 202) to be potentially useful for addressing local environment verification test failures corresponding to risks identified in or represented in a respective risk evaluation report.

In some embodiments, while using user interface 1000, for example while viewing a respective risk evaluation report 1006, the user can invoke an environment verification module (e.g., environment verification module 820*a* or 820*b*), so as to view any of the local environment verification reports discussed above with reference to FIG. 9.

FIGS. 11A-11D include a flow diagram representing a method 1100 for identifying computational machines at nodes of a computer network, and/or control categories (corresponding to subsets of local environment verification tests performed by computational machines at nodes of the computer network), having risk scores satisfying predefined criteria, in accordance with some embodiments. Method 1100 is performed at a server system (e.g., server 108, FIG. 1, server 202, FIGS. 2 and 8B, or administrator machine 220, FIGS. 2 and 8A) in a computer network (e.g., network 100, FIG. 1) that has a plurality of nodes, wherein each node includes a respective computational machine (e.g., computational machine 102) and has a respective defined location in a linearly ordered communication orbit (e.g., any of the linear communication orbits 106, FIG. 1) that includes the plurality of nodes.

Method 1100 includes the server system transmitting (1102), via the linearly ordered communication orbit, a set of local environment verification tests, to the computational machines at a first subset of nodes in the computer network, and also transmitting (1104), via the linearly ordered communication orbit, a set of mappings that map results of the local environment verification tests into a set of risk scores, to the computational machines at a first subset of nodes in the computer network. As described above with reference to FIG. 3A, the same or different communications can be transmitted for distributing the set of local environment verification tests and the set of mappings to the computational machines at a first subset of nodes in the computer network. In addition, if either or both of these (set of local environment verification tests and the set of mappings) includes a large amount of information, one or more corresponding manifests may be distributed to the computational machines with instructions to obtain all the shards identified in the one or more manifests, and then to combine the shards to form the items that together comprise the set of local environment verification tests and/or the set of mappings.

Method 1100 further includes transmitting (1106), via the linearly ordered communication orbit, one or more requests to a plurality of the nodes in the first subset of nodes. The one or more requests are requests (1108, 1110, 1112) that cause the computational machine at each respective node of the plurality of nodes in the first subset of nodes to: locally evaluate (1108) the set of local environment verification tests to produce test results for the computational machine at the respective node; locally map (1110) the test results using the set of mappings into a set of risk scores for the computational machine at the respective node; and locally store (1112), at the computational machine at the respective node, the test results and risk scores. Local evaluation of the set of local environment verification tests to produce test results for the computational machine is discussed above with reference to environment verification module 820*c*. The generation of risk scores is discussed above with reference to risk evaluation modules 840*a* and 840*b*, and risk scoring module 825.

Method 1100 also includes transmitting (1120), via the linearly ordered communication orbit, one or more queries to the plurality of nodes in the first subset of nodes; wherein the one or more queries cause the computational machines at the plurality of nodes to return to the server system at least a portion of the test results and risk scores locally stored at the computational machines at the plurality of nodes. The server system receives (1122) in response to the one or more queries, via the linearly ordered communication orbit, from the plurality of nodes, test results and risk scores sent by the computational machines at the plurality of nodes in response to the one or more queries; and identifies (1124), based on the received test results and risk scores, computational machines and/or control categories having risk scores satisfying predefined criteria. The generation of risk evaluation reports is discussed above with reference to risk evaluation module 840*a*.

In some embodiments, method 1100 includes producing (1130) a listing of computational machines ordered in accordance with risks scores for those machines, as discussed above with reference to risk evaluation module 840*a*.

In some embodiments, method 1100 includes producing (1132), in accordance with the risk scores received from the plurality of nodes in the first subset of nodes, information identifying control categories, each corresponding to a subset of the set of local environment verification tests, having risk scores satisfying predefined criteria. Examples of reports having such information are discussed above with reference to risk evaluation module 840*a*.

In some embodiments, method 1100 includes producing (1134) a listing of computational machines, or groups of computational machines, ordered in accordance with risks scores for those computational machines or combined risk scores for those groups of computational machines. Examples of reports having such information are discussed above with reference to risk evaluation module 840*a*.

In some embodiments, method 1100 includes combining (1136), for each respective computational machine at the plurality of nodes, one or more predefined groups of the risk scores received from the respective computational machine, to produce one or more combined risk scores (e.g., control category risk scores) for the respective computational machine; and identifying (1138), based on at least one of the combined risk scores, computational machines in at the plurality of nodes, having highest risk with respect to one or more control categories. Examples of combining risk scores for sets of rest results to produce control category risk sores, and examples of risk evaluation reports having such information are discussed above with reference to risk evaluation module 840*a*. In some other embodiments, the combining of risk scores, for a respective computational machine, to produce combined risk scores is performed, at least in part (e.g., by generating at least a set of lowest level control category risk scores), by the respective computational machine, thereby distributing the associated computational load among the computational machines.

In some embodiments, any of the embodiments of method 1100 discussed above includes providing (1140), for an identified computational machine, information identifying control categories, each corresponding to a subset of the set of local environment verification tests, having risk scores satisfying predefined risk assessment criteria. Examples of reports having such information are discussed above with reference to risk evaluation module 840*a*.

In some embodiments, any of the embodiments of method 1100 discussed above includes determining (1142), by combining risk scores received from the computational machines in a first group of computational machines, combined risk scores for each of a plurality of control categories, each corresponding to a subset of the set of local environment verification tests; and providing (1144), for the first group of computational machines, information identifying control categories of the plurality of control categories having combined risk scores satisfying predefined risk assessment criteria. Examples of reports having combined risk scores for a plurality of control categories are discussed above with reference to risk evaluation module 840*a*.

In some embodiments, any of the embodiments of method 1100 discussed above includes automatically identifying (1146), for a respective computational machine, or a group of the computational machines, or respective control category, one or more remedial actions; and in accordance with user selection of one or more of the identified one or more remedial actions, transmitting (1148), via the linearly ordered communication orbit, to one or more of the computational machines at the first subset of nodes, instructions to execute the user-selected one or more remedial actions. For example, referring to FIG. 10, while viewing a risk assessment report 1006, the user of the risk evaluation module can select one or more remedial actions from among a set of one or more remedial actions automatically identified by the risk evaluation module 840*a* or 840*b*, and then instructions to execute the user-selected one or more remedial actions are transmitted to one or more of the computational machines at the first subset of nodes.

It should be understood that the particular order in which the operations in FIGS. 11A-11D have been described is merely an example and is not intended to indicate that the described order is the only order in which the operations could be performed. One of ordinary skill in the art would recognize various ways to verify local environment for computational machines coupled at respective nodes of a linear communication orbit as described herein.

Figure 12A:
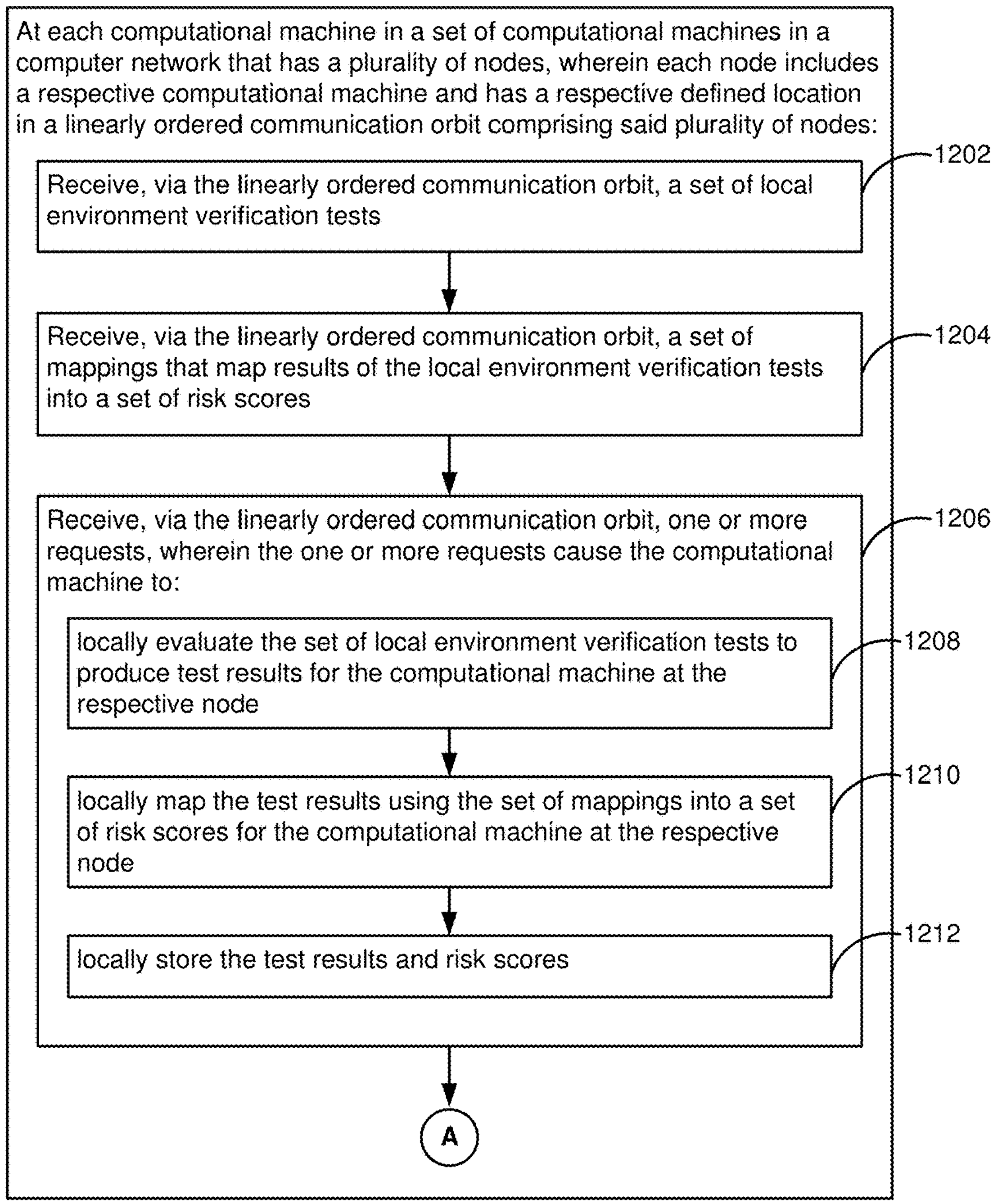
FIG. 12A-12B include a flow diagram representing a method for locally generating, at computational machines at nodes of a computer network, local environment verification test results, and corresponding risk scores, and providing at least a subset of the generated local environment verification test results and corresponding risk scores to a server system, in accordance with some embodiments.
Figure 12B:
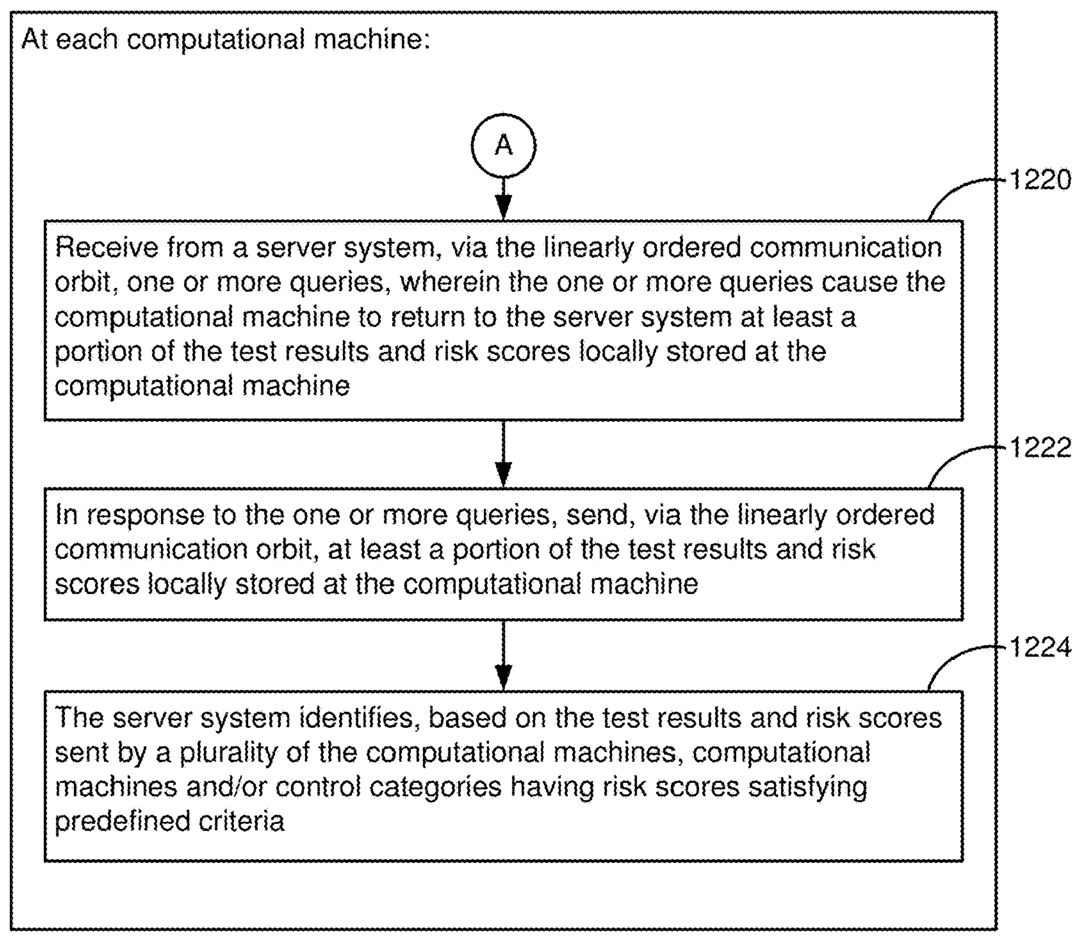

FIGS. 12A-12B include a flow diagram representing a method 1200 for locally generating, at computational machines at nodes of a computer network, local environment verification test results, and corresponding risk scores, and providing at least a subset of the generated local environment verification test results and corresponding risk scores to a server system, in accordance with some embodiments. Method 1200 is performed at each computation machine (e.g., computational machine 102, FIGS. 1 and 8C, and computational machines 208-218, FIG. 2) in a set of computational machines in a computer network that has a plurality of nodes. Each such node includes a respective computational machine and has a respective defined location in a linearly ordered communication orbit that includes the plurality of nodes.

Method 1200 includes receiving (1202) (e.g., from a server system), via the linearly ordered communication orbit, a set of local environment verification tests; and receiving (1204), via the linearly ordered communication orbit, a set of mappings that map results of the local environment verification tests into a set of risk scores. As described above with reference to FIG. 3A, the same or different communications can be used for distributing the set of local environment verification tests and the set of mappings to the computational machines at a first subset of nodes in the computer network. In addition, if either or both of these includes a large amount of information, one or more corresponding manifests may be distributed to the computational machines with instructions to obtain all the shards identified in the one or more manifests, and then to combine the shards to form the items that together comprise the set of local environment verification tests and/or the set of mappings.

Method 1200 further includes receiving (1206), via the linearly ordered communication orbit, one or more requests. The one or more requests cause the computational machine to locally evaluate (1208) the set of local environment verification tests to produce test results for the computational machine; locally map (1210) the test results using the set of mappings into a set of risk scores for the computational machine; and locally store (1212), at the computational machine, the test results and risk scores. Local evaluation of the set of local environment verification tests to produce test results for the computational machine is discussed above with reference to environment verification module 820*c*. The generation of risk scores is discussed above with reference to risk evaluation modules 840*a* and 840*b*, and risk scoring module 825.

Method 1200 also includes receiving (1220) from a server system, via the linearly ordered communication orbit, one or more queries. In response to the one or more queries, the computational machine returns (1222) to the server system at least a portion of the test results and risk scores locally stored at the computational machines. The return of information from computational machines to a server system, in response to a query, is discussed above with reference to FIGS. 3A, 3B and 7.

While not strictly part of method 1200, since it concerns operations of the server system, it is noted that the server system, identifies (1224), based on the test results and risk scores sent by a plurality of the computational machines, computational machines and/or control categories having risk scores satisfying predefined criteria. The generation of risk evaluation reports with such information is discussed above with reference to risk evaluation module 840*a* and 840*b*, and risk evaluation module user interface 1000, FIG. 10.

It should be understood that the particular order in which the operations in FIGS. 12A-12B have been described is merely an example and is not intended to indicate that the described order is the only order in which the operations could be performed. One of ordinary skill in the art would recognize various ways to verify local environment for computational machines coupled at respective nodes of a linear communication orbit as described herein.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method, including:

at a machine in a computer network that has a plurality of nodes, wherein each node of the plurality of nodes comprises a computational machine and has a defined location in a linearly ordered communication orbit comprising said plurality of nodes:

transmitting, via the linearly ordered communication orbit, one or more requests to a plurality of recipient nodes in a first subset of the plurality of nodes, wherein the one or more requests cause the computational machine of each recipient node of the plurality of recipient nodes to:

locally evaluate a set of local environment verification tests to produce test results for the computational machine at the recipient node;

receiving, via the linearly ordered communication orbit, from the plurality of recipient nodes, test results locally generated and sent by the computational machines of the plurality of recipient nodes;

automatically determining one or more risk scores based on the received test results for each of the respective computational machines; and identifying, based on at the one or more risk scores, computational machines having a highest risk with respect to one or more control categories.

2. The method of claim 1, further comprising:

deploying a local environment verification framework to at least one of the plurality of nodes; and receiving an indication from the at least one of the plurality of nodes of successful completion of the deployed local environment verification framework.

3. The method of claim 1, further comprising:

deploying a local environment verification framework to at least one of the plurality of nodes; and receiving an indication from the at least one of the plurality of nodes of unsuccessful completion of the deployed local environment verification framework.

4. The method of claim 1, further comprising:

normalizing the received test results to generate a first control category risk score for a first control category, wherein the first control category corresponds to a first plurality of verification tests, wherein normalizing the received test results to generate the first control category risk score includes:

summing risk scores for corresponding test results within the first control category into a summed risk score for the first control category; and applying a respective scaling factor to the summed risk score for the first control category.

5. The method of claim 1, further comprising:

issuing one or more remedial action commands to the at least one of the plurality of nodes.

6. The method of claim 5, wherein the one or more remedial actions are automatically determined based on a corresponding one or more of the test results received from the plurality of recipient nodes.

7. The method of claim 6, wherein the one or more remedial actions are automatically determined to address one or more of the test results.

8. The method of claim 1, further comprising, generating a respective control category risk report, for a respective computational machine, corresponding to respective control category risk scores representing risk categories of the respective computational machine.

9. The method of claim 8, further comprising, generating a second control category risk report, for a group of computational machines, corresponding to a plurality of lower-level control category risk scores.

10. The method of claim 1, wherein the received test results includes visualization tools for prioritizing computational machines that represent the greatest risk.

11. A machine in a computer network that has a plurality of nodes, wherein each node of the plurality of nodes comprises a computational machine and has a defined location in a linearly ordered communication orbit comprising said plurality of nodes, the machine comprising:

a set of one or more processors; and a non-transitory computer readable storage medium that provides instructions that, when executed by one or any combination of the set one or more processors, causes the machine to perform operations comprising:

transmitting, via the linearly ordered communication orbit, one or more requests to a plurality of recipient nodes in a first subset of the plurality of nodes, wherein the one or more requests cause the computational machine of each recipient node of the plurality of recipient nodes to:

locally evaluate a set of local environment verification tests to produce test results for the computational machine at the recipient node;

receiving, via the linearly ordered communication orbit, from the plurality of recipient nodes, test results locally generated and sent by the computational machines of the plurality of recipient nodes;

automatically determining one or more risk scores based on the received test results for each of the respective computational machines; and identifying, based on at the one or more risk scores, computational machines having a highest risk with respect to one or more control categories.

12. The machine of claim 11, the operations further comprising:

deploying a local environment verification framework to at least one of the plurality of nodes; and receiving an indication from the at least one of the plurality of nodes of successful completion of the deployed local environment verification framework.

13. The machine of claim 11, the operations further comprising:

deploying a local environment verification framework to at least one of the plurality of nodes; and receiving an indication from the at least one of the plurality of nodes of unsuccessful completion of the deployed local environment verification framework.

14. The machine of claim 11, the operations further comprising:

normalizing the received test results to generate a first control category risk score for a first control category, wherein the first control category corresponds to a first plurality of verification tests, wherein normalizing the received test results to generate the first control category risk score includes:

summing risk scores for corresponding test results within the first control category into a summed risk score for the first control category; and applying a respective scaling factor to the summed risk score for the first control category.

15. The machine of claim 11, the operations further comprising:

issuing one or more remedial action commands to the at least one of the plurality of nodes.

16. The machine of claim 15, wherein the one or more remedial actions are automatically determined based on a corresponding one or more of the test results received from the plurality of recipient nodes.

17. The machine of claim 16, wherein the one or more remedial actions are automatically determined to address one or more of the test results.

18. The machine of claim 11, the operations further comprising, generating a respective control category risk report, for a respective computational machine, corresponding to respective control category risk scores representing risk categories of the respective computational machine.

19. The machine of claim 18, the operations further comprising, generating a second control category risk report, for a group of computational machines, corresponding to a plurality of lower-level control category risk scores.

20. The machine of claim 11, wherein the received test results includes visualization tools for prioritizing computational machines that represent the greatest risk.

* * * * *